(12) United States Patent
Hanner et al.

(10) Patent No.: US 7,875,678 B2
(45) Date of Patent: Jan. 25, 2011

(54) PROCESS FOR MAKING HIGH IMPACT STRENGTH POLYSTYRENE AND RELATED COMPOSITIONS

(75) Inventors: Michael J. Hanner, Marietta, OH (US); Chen-Youn Sue, Williamstown, WV (US); Clifford C. Pettey, Fleming, OH (US); Carleton Stouffer, Bartlesville, OK (US); Paul M. Hunt, Belpre, OH (US); Ken E. Bowen, Belpre, OH (US)

(73) Assignee: Chevron Phillips Cheimcal Company, LP, The Woodlands, TX (US)

( * ) Notice: Subject to any disclaimer, the term of this patent is extended or adjusted under 35 U.S.C. 154(b) by 1034 days.

(21) Appl. No.: 11/279,308

(22) Filed: Apr. 11, 2006

(65) Prior Publication Data

US 2006/0235130 A1    Oct. 19, 2006

Related U.S. Application Data

(60) Provisional application No. 60/671,924, filed on Apr. 15, 2005.

(51) Int. Cl.
*C08L 53/00* (2006.01)
*C08L 9/00* (2006.01)
*C08L 25/00* (2006.01)
*C08F 279/02* (2006.01)
*C08F 287/00* (2006.01)

(52) U.S. Cl. ............................ 525/99; 525/88; 525/98; 525/232; 525/236; 525/237; 525/241; 525/242; 525/243

(58) Field of Classification Search ................... 525/88, 525/191, 241, 242, 243, 98, 99, 232, 236, 525/237
See application file for complete search history.

(56) References Cited

U.S. PATENT DOCUMENTS

| | | | |
|---|---|---|---|
| 4,294,937 A | 10/1981 | Whitehead | |
| 5,240,993 A * | 8/1993 | Aerts et al. | 525/52 |
| 5,473,014 A | 12/1995 | Ando et al. | |
| 5,756,579 A * | 5/1998 | Fornasari et al. | 525/99 |
| 5,985,997 A | 11/1999 | Bowen et al. | |
| 7,208,547 B2 | 4/2007 | Rego et al. | |
| 2005/0187344 A1* | 8/2005 | Wilkey et al. | 525/88 |
| 2006/0194915 A1 | 8/2006 | Morales-Balado et al. | |

FOREIGN PATENT DOCUMENTS

| | | |
|---|---|---|
| CN | 1328068 | 12/2001 |
| EP | 0167707 | 1/1986 |
| EP | 0403902 | 12/1990 |
| EP | 0562804 | 9/1993 |
| EP | 0590965 | 4/1994 |
| EP | 732345 A1 * | 9/1996 |
| JP | 8027234 | 1/1996 |
| WO | WO 2004/041887 | 5/2004 |
| WO | WO 2004072172 A1 * | 8/2004 |

OTHER PUBLICATIONS

Search Report for International Application No. PCT/US2006/013545.

* cited by examiner

*Primary Examiner*—Irina S Zemel
*Assistant Examiner*—Jeffrey Lenihan
(74) *Attorney, Agent, or Firm*—Fletcher Yoder, P.C.

(57) ABSTRACT

Compositions, processes, and methods are provided relating to styrenic polymers, including high impact polystyrene (HIPS), also referred to as rubber-modified polystyrene. In one aspect, a process is provided for making high impact polystyrenes, comprising the steps of combining a monovinylarene component, a monovinylarene-conjugated diene block copolymer, and a conjugated diene polymer. In another aspect, the feed components form an emulsion having a continuous phase and a dispersed phase. The continuous phase comprises at least a portion of the monovinylarene component and at least a portion of the conjugated diene polymer. The dispersed phase is suspended within the continuous phase, and comprises globules having at least a portion of the monovinylarene-conjugated diene block copolymer, a remaining portion of the monovinylarene component, and a remaining portion of the conjugated diene polymer. The monovinylarene component is polymerized in the presence of the emulsion alone or in the presence of other feedstocks.

40 Claims, 5 Drawing Sheets

FIG. 3
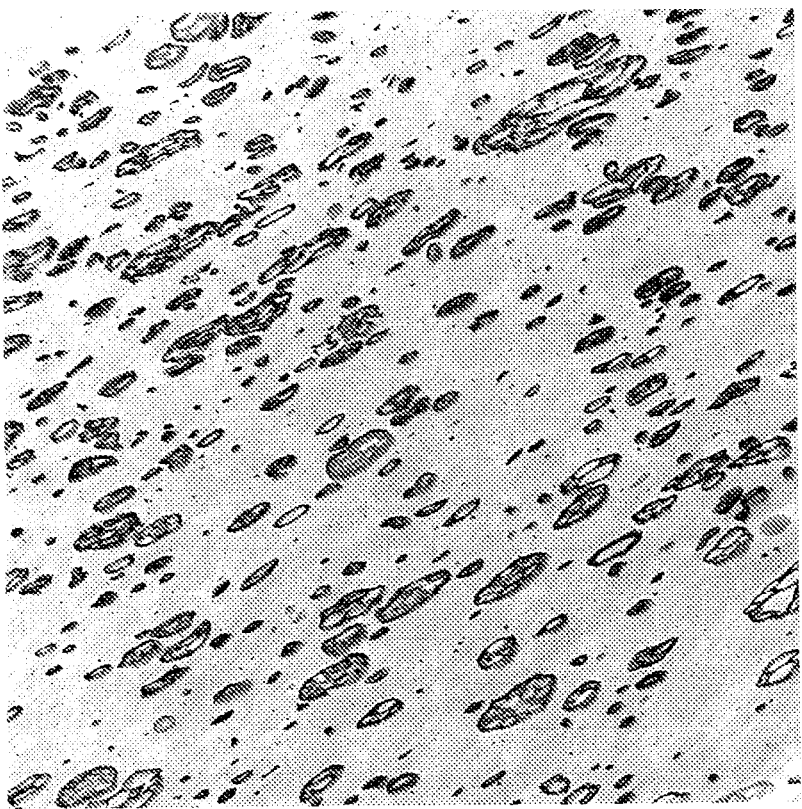
Present Invention HIPS Domain Detail
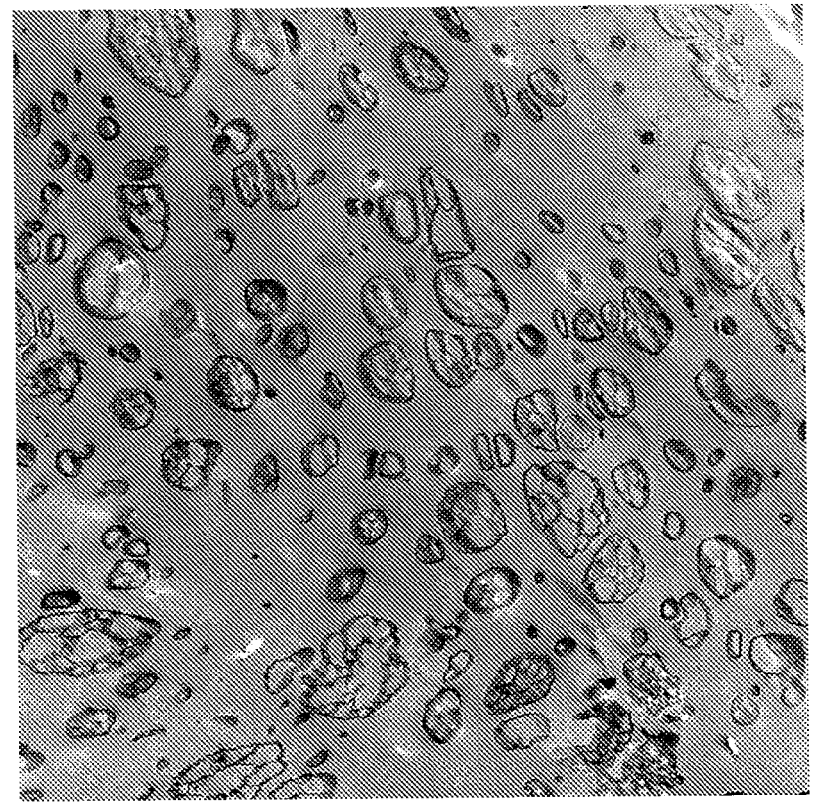
Regular HIPS Domain Detail Izod and Gloss vs. Rubber Particle Size (50%) at 12% Rubber Ratio Izod and Gloss vs. Rubber Particle Size (50%) at 14% Rubber Ratio

PROCESS FOR MAKING HIGH IMPACT STRENGTH POLYSTYRENE AND RELATED COMPOSITIONS

CROSS REFERENCE TO RELATED APPLICATIONS

This application claims the benefit of U.S. Provisional Patent Application Ser. No. 60/671,924 filed on Apr. 15, 2005, which is hereby incorporated by reference in its entirety.

TECHNICAL FIELD OF THE INVENTION

The present invention relates to a process of making a high impact strength polystyrene resin and related compositions.

BACKGROUND

Unmodified polystyrene resin, often called crystal polystyrene or general purpose polystyrene, is typically a rather brittle resin having poor impact strength. The impact strength of polystyrene can be greatly improved by the addition of rubbery particles dispersed throughout the polystyrene resin. Polystyrene resins having improved strength achieved by addition of rubbery particles are often referred to as high impact polystyrene (HIPS), or rubber-modified polystyrene. The size of the rubbery particles and the concentration of rubber particles dispersed within the HIPS resin are believed to affect the impact strength of the HIPS resin.

The addition of the rubbery particles to polystyrene to form the HIPS resin tends to result in a reduction of the aesthetic properties of the HIPS resin and the products made from the HIPS resin. As an example, the lack of gloss of conventional HIPS resins is often a disadvantage relative to materials such as acrylonitrile-butadiene-styrene (ABS) resin, as ABS resin generally has both high impact strength and high gloss. Many consumer products require a balance of both gloss and impact strength. Examples of such products include telephones, housewares, refrigerator parts, lawn and garden tools, refrigerator liners, kitchen appliances, electronics housings, computer housings and components, water cooler housings, television housings and screens, vacuum cleaners, microwave oven doors, toys, window pieces, packaging articles, beverage containers, medical parts, etc.

Others have attempted to use other types of rubbery materials, such as styrene-butadiene block copolymers, in the preparation of HIPS resins to increase the gloss of the HIPS. Nevertheless, the impact strength of HIPS was decreased at the same time as the gloss improved. It is generally accepted that the impact strength of the HIPS resins is related to the rubbery nature of the rubbery particles. The most commonly accepted measure of this rubbery nature of the rubbery particles is the glass transition temperature, Tg, of the rubbery particles. It is also generally accepted that HIPS polymers with higher impact strengths are produced with rubbery particles having low glass transition temperatures. When styrene-butadiene block copolymers are used in the preparation of HIPS, the glass transition temperatures of the styrene-butadiene block copolymers are generally much higher than the rubbery particles due to the presence of the high Tg styrene content within the styrene-butadiene block copolymers. For example, the Tg's of polybutadienes are in the range of about −90° C. to about −110° C., whereas the Tg of polystyrene is about 100° C. Generally, if a styrene-butadiene block copolymer is used to produce a HIPS resin, a styrene-butadiene block copolymer with a minimum amount of styrene, normally less than 50 wt. % monovinylarene, is used.

SUMMARY OF THE INVENTION

The invention provides various compositions, processes, and methods relating to styrenic polymers. As an example, in one aspect, a process is provided for making a high impact polystyrene, comprising the steps of combining a monovinylarene component, a monovinylarene-conjugated diene block copolymer, and a conjugated diene polymer. In some embodiments, the monovinylarene component and the conjugated diene polymer are combined first, followed by combining them with the monovinylarene-conjugated diene block copolymer. In other embodiments, the three components are supplied substantially simultaneously.

In some embodiments, the monovinylarene component, the monovinylarene-conjugated diene block copolymer, and the conjugated diene polymer can form an emulsion having a continuous phase and a dispersed phase. The continuous phase comprises at least a portion of the monovinylarene component and at least a portion of the conjugated diene polymer. The dispersed phase is suspended within the continuous phase, and comprises globules having at least a portion of the monovinylarene-conjugated diene block copolymer, a remaining portion of the monovinylarene component, and a remaining portion of the conjugated diene polymer. The first monovinylarene component is polymerized in the presence of the emulsion to produce the high impact polystyrene alone or in the presence of other feedstocks.

It will be appreciated that the dispersed particles within the emulsion are generally referred to as globules, and the dispersed particles within the polymerized high impact polystyrene are generally referred to as domains.

In an aspect, the monovinylarene-conjugated diene block copolymer has a monovinylarene component content of greater than 50 wt. %. In another aspect, the monovinylarene-conjugated diene block copolymer comprises at least one tapered block segment. In another aspect, the monovinylarene-conjugated diene block copolymer comprises at least one conjugated diene monoblock segment.

As an example, under such processes described herein, a high impact polystyrene composition can be produced having a 60 degree angle gloss when molded at 150° F. in a range of about 85% to about 105% and a tensile yield strength in a range of about 3800 psi to about 5500 psi. The high impact polystyrene composition can have an ⅛" notch Izod in a range of about 0.5 ft-lb/inch to about 8 ft-lb/inch. The high impact polystyrene of the present invention generally maintains its impact strength properties, even at higher gloss values. Other compositions are also possible.

As another example, in another aspect, a feedstock emulsion and a process for producing said feedstock emulsion is provided that is suitable for use in a styrenic polymerization process. The emulsion comprises a first monovinylarene component, a first conjugated diene polymer, and a monovinylarene-conjugated diene block copolymer. Various features of the emulsion, process, and resulting products are described herein. Such features, including but not limited to composition, viscosity, particle size, particle distribution, gloss, and impact strength can be taken as embodiments of the invention, either alone or in any combination.

As another embodiment, a feedstock additive for a styrene polymerization reaction is provided. The feedstock additive comprises the first conjugated diene polymer and the monovinylarene-conjugated diene block copolymer. The monovinylarene-conjugated diene block copolymer used to form the feedstock additive has a monovinylarene content of greater than 50 wt. %.

Additional embodiments of the invention will be apparent by reference to the figures, claims, and detailed description provided herein.

Unless specified to the contrary or apparent from the plain meaning of a phrase, the word "or" has the inclusive meaning. The adjectives "first," "second," and so forth are not to be construed as limiting the modified subjects to a particular order in time, space, or both, unless specified to the contrary. A "copolymer" is used herein to refer to any polymer comprising at least two types of units, e.g., two types of units, three types of units, etc.

BRIEF DESCRIPTION OF THE DRAWINGS

FIG. 3 contains Transmission Electron Micrographs of a traditional HIPS resin and a HIPS resin produced in accordance with an embodiment of the present invention;

DETAILED DESCRIPTION OF THE INVENTION

Process of Making a High Impact Polystyrene

Figure 1:
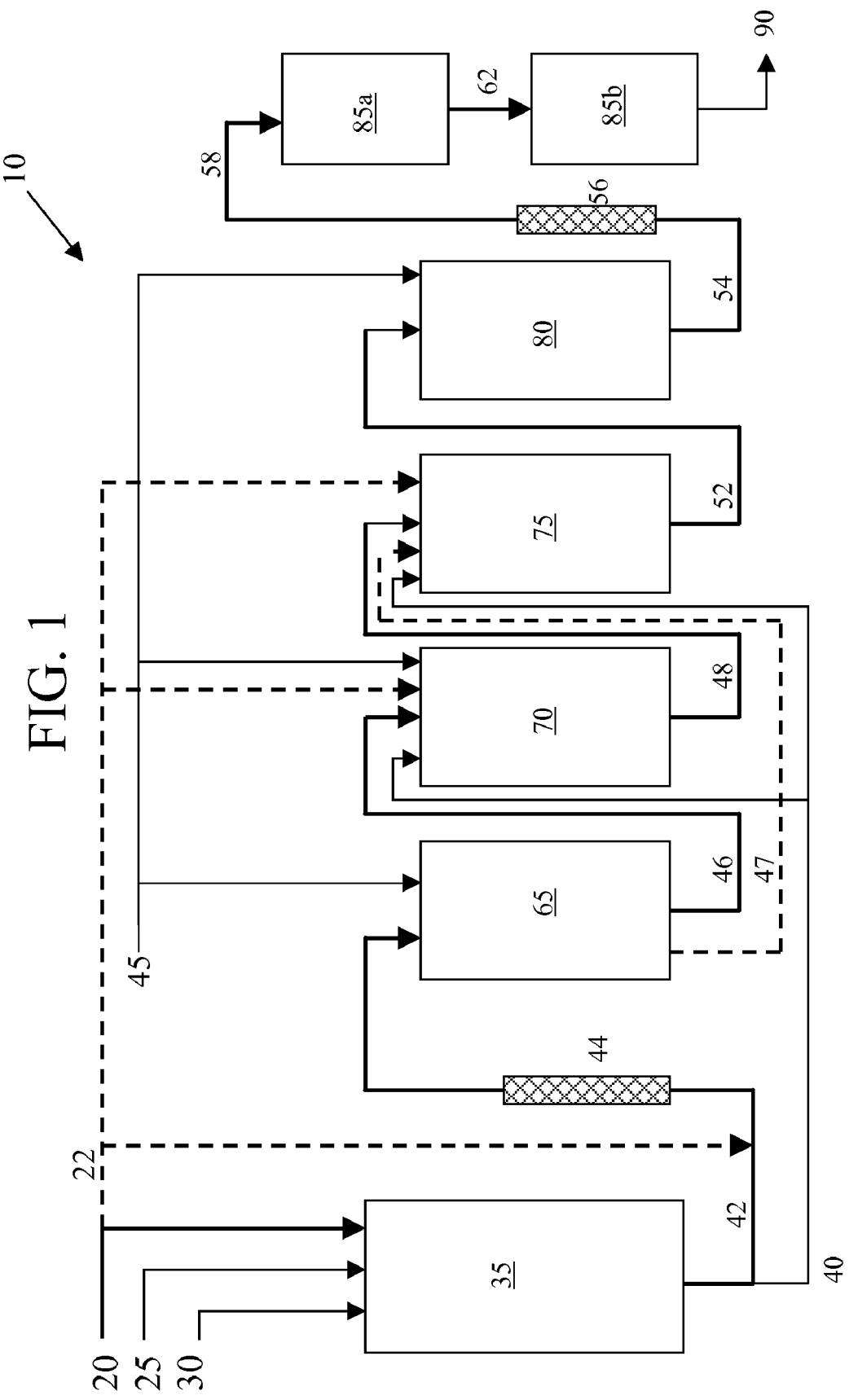
FIG. 1 is a process flow diagram for a process of making a high impact polystyrene.

As an embodiment of the present invention, a process 10 of making a high impact polystyrene 90 is provided, as shown in FIG. 1. It will be appreciated that numerous other process configurations are possible.

The process 10 comprises combining a first monovinylarene component 20, a monovinylarene-conjugated diene block copolymer 25, and a first conjugated diene polymer 30 to form an emulsion 42 within a first apparatus 35. The first apparatus 35 can be any type of process equipment that is capable of allowing the emulsion 42 to be formed. Examples include a tank, a process vessel, a kettle, an in-line mixer, and the like. Suitable types of process equipment for the first apparatus 35 will be apparent to those of skill in the art and are to be considered within the scope of the present invention.

The emulsion 42 comprises a continuous phase and a dispersed phase. The continuous phase comprising at least a portion of the first monovinylarene component 20 and at least a portion of the first conjugated diene polymer 30. The dispersed phase comprises globules having at least a portion of the monovinylarene-conjugated diene block copolymer 25, a remaining portion of the first monovinylarene component 20, and a remaining portion of the first conjugated diene polymer 30 contained therein. The emulsion 42 can be sent to a mixer 44, such as a static mixer, if needed. The emulsion 42 is then supplied to a first reactor 65 where the first monovinylarene component 20 is polymerized in the presence of the emulsion 42 to produce reactor effluent stream 46. At least a portion of the emulsion 40 can be sent to one or more subsequent or downstream reactors 70, 75. In some embodiments, as shown in FIG. 1, the effluent stream 46 from the first reactor 65 can be sent to one or more subsequent or downstream reactors 70, 75, as needed to achieve a desired completion of the polymerization process (illustrated by optional stream 47) and producing the high impact polystyrene 90. When more than one reactor is used, the effluent streams 46, 48, and 52 are sent to the next downstream reactor 70, 75, 80 to continue with the polymerization process to produce the high impact polystyrene 90 and for the finishing steps described herein.

In some embodiments, the first monovinylarene component 20, the monovinylarene-conjugated diene block copolymer 25, and the first conjugated diene polymer 30 can be sent to the first apparatus 35 substantially simultaneously. In other embodiments, the components can be sent individually and in any order.

In an aspect (not shown), the first monovinylarene component 20 and the first conjugated diene polymer 30 can be combined in the first reactor 65 to produce a reactor feedstock, followed by combining the reactor feedstock with the monovinylarene-conjugated diene block copolymer 25. In some embodiments, the monovinylarene-conjugated diene block copolymer 25 can be in pellet form, dissolved in a solvent, molten, or supplied in other forms that will apparent to those of skill in the art.

In some embodiments, the first apparatus 35 is not required (not shown). In such embodiments, the first monovinylarene component 20, the monovinylarene-conjugated diene block copolymer 25, and the first conjugated diene polymer 30 are combined in the first reactor 65, where the emulsion is formed prior to the polymerization of the first monovinylarene component 20 in the presence of emulsion 42. The first reactor 65 can be used to form the emulsion and to polymerize the first monovinylarene component 20 in the presence of the emulsion.

In some embodiments, the emulsion 42 can be polymerized in the presence of a second monovinylarene component 22 that is supplied after the emulsion 42 has been formed. Additional monovinylarene components 22 can also be supplied during the polymerization process after forming the emulsion 42. As shown in FIG. 1, stream 22 is taken from stream 20. It will be appreciated that in other embodiments, stream 22 can be a different monovinylarene component from the monovinylarene component in stream 20. Likewise, whereas FIG. 1 illustrates the optional addition of stream 22 to reactors 70 and 75, in other embodiments these reactors can receive other monovinylarene components, which can be different from that of stream 20, and from each other.

In some embodiments, the emulsion 42 can be polymerized in the presence of a second monovinylarene-conjugated diene block copolymer (not shown) that is supplied after the emulsion 42 has been formed. It will be appreciated that in other embodiments, the second monovinylarene-conjugated diene block copolymer can be a different monovinylarene component from the monovinylarene-conjugated diene block copolymer in stream 25.

A continuous bulk polymerization process, which includes a plurality of reaction zones in series where the degree of polymerization (the amount of monomer converted to polymer) increases from the first reactor 65 to the last reactor 80, is an example of a suitable process for use in the present invention. The reactors suitable for this process 10 include many reactor designs that are typically in use in polystyrene bulk polymerization processes. Examples of suitable reactors include Continuous Stirred Tank Reactors (CSTR), Stirred Tower Reactors, Axially Segregated Horizontal Reactors, Pipe Reactors with Static Mixers, and the like. Useful features of the reactors suitable for the process 10 of the present invention include a temperature control element, a mixing element, and the ability to control the residence time in a given reactor.

A particularly suitable type of reactor for the process 10 of the present invention is the CSTR. Other reactor types can also be used. The CSTR is advantageous because it allows for precise independent control of the residence time in a given reactor by adjusting the level in a given reactor. Thus, the residence time of the component mixtures can be independently adjusted and optimized in each of the reactors in series.

In some embodiments, the process 10 of making the high impact polystyrene 90 further comprises customizing or controlling a viscosity of the emulsion 42 to control an average globule particle size, which in turns can affect an average domain particle size in the high impact polystyrene 90. Several variables can be changed to control the viscosity of the emulsion 42. As an example, the emulsion viscosity can be controlled by controlling the amount, structure, molecular weight, or viscosity of the first conjugated diene polymer 30 combined in the emulsion 42. Generally, the more first conjugated diene polymer 30 that is combined to produce the emulsion 42, the higher solids concentration within the emulsion 42, which in turn increases the viscosity of the emulsion 42. An increase in the viscosity of the conjugated diene polymer 30 can also increase the viscosity of the emulsion 42. An increase in the viscosity of the emulsion 42 can result in an increase in the average globule particle size contained within the emulsion 42. Generally, the higher the molecular weight, viscosity, or amount of the first conjugated diene polymer 30, the higher the viscosity of the emulsion 42.

The emulsion viscosity can also be controlled by utilizing the monovinylarene-conjugated diene block copolymer 25 having different compositions, molecular weight, or structures and controlling an amount of the monovinylarene-conjugated diene block copolymer 25 combined in the process. Generally, the molecular weight, the higher conjugated diene polymer content, and the structure of the monovinylarene-conjugated diene block copolymer 25 affect the emulsion viscosity. An increase in the molecular weight of the monovinylarene-conjugated diene block copolymer 25 can result in an increase in the average globule particle size. As an example, the composition of the monovinylarene-conjugated diene block copolymer 25 can be controlled by utilizing the monovinylarene-conjugated diene block copolymer 25 having a conjugated diene polymer content of greater than about 25 wt. %. Generally, the higher the conjugated diene polymer content within the monovinylarene-conjugated diene block copolymer 25, the lower the average globule particle size. The composition of the monovinylarene-conjugated diene block copolymer 25 can also be controlled by utilizing the monovinylarene-conjugated diene block copolymer 25 having a monovinylarene component content of greater than 50 wt. %.

In another aspect, the process of making the high impact polystyrene 90 also comprises controlling a viscosity of the first conjugated diene polymer 30 to control the average globule particle size within the emulsion 42. In a further aspect, the average globule particle size can be controlled by controlling a molecular weight of the first conjugated diene polymer 30. The composition of the monovinylarene-conjugated diene block copolymer 25 can also be controlled by changing the block sequence, block molecular weight, and type of blocks employed.

In some embodiments, other methods of controlling the viscosity of the emulsion 42 or of any of its components 20, 25, 30 of the emulsion 42 can be used, such as agitation. Other suitable methods of controlling the viscosity of the emulsion 42 and of its components 20, 25, 30 will be apparent to those of skill in the art and are to be considered within the scope of the present invention.

In an aspect of the present invention, the step of reacting the emulsion 42 can include grafting the globules with the first monovinylarene component 20. The grafting step occurs during the step of reacting the emulsion 42.

In some embodiments, when combining the first monovinylarene component 20, the monovinylarene-conjugated diene block copolymer 25, and the first conjugated diene polymer 30, each component can be combined simultaneously to form the emulsion 42. Alternatively, each component can be combined separately. It is believed that the components can be combined in any order, however, slight variations in the emulsion 42 can occur, as described herein.

In some embodiments, more than one emulsion 42 can be separately formed. Each of the emulsions can have different average globule particle sizes, different monovinylarene-conjugated diene block copolymers, different conjugated diene polymers, or combinations thereof. The separately formed emulsions can then be combined and fed to the first reactor 65 together. Alternatively, the separately formed emulsions can be sent separately to the first reactor 65.

In some embodiments, more than one type of monovinylarene-conjugated diene block copolymer 25 can be used in the process 10. When more than one type of monovinylarene-conjugated diene block copolymer 25 is used, in some embodiments, each of the monovinylarene-conjugated diene block copolymers 25 can be combined to form different emulsions 42 separately with each of the different emulsions 42 having different particle sizes. The different emulsions 42 can then be supplied to a common reactor for the polymerization reaction steps described herein. Any of the monovinylarene-conjugated diene block copolymers 25 described herein can be used. In some embodiments, more than one monovinylarene-conjugated diene block copolymer can be sent to the first apparatus 35 or to the first reactor 65, along with the remaining components.

In some embodiments, the step of reacting the emulsion 42 comprises reacting the emulsion 42 in more than one reactor. When more than one reactor is used, phase inversion of the first conjugated diene polymer 30 can occur in a first reactor.

While not wishing to be bound by theory, as used herein, the term "phase inversion" refers to the phenomena that occurs when the first conjugated diene polymer 30 contained within the continuous phase transitions to the dispersed phase so that when phase inversion occurs more of the first conjugated diene polymer 30 is present in the dispersed phase than was contained within the continuous phase when the emulsion 42 was formed.

When the emulsion 42 is formed, the continuous phase, which is a liquid, contains at least a portion of the first monovinylarene component 20 and at least a portion of the first conjugated diene polymer 30. The dispersed phase, which is also a liquid, contains the monovinylarene-conjugated diene block copolymer 25, a remaining portion of the first monovinylarene component 20, and a remaining portion of the first conjugated diene polymer 30. The monovinylarene-conjugated diene block copolymer 25 and the remaining portion of the first conjugated diene polymer 30 are typically at least partially co-dissolved in the remaining portion of the first monovinylarene component 20. It is believed that the first conjugated diene polymer 30 contained within the continuous phase is attracted by the dispersed phase, which essentially attaches itself to the globules, while simultaneously being pushed out of the continuous phase by an increasing volume of the high impact polystyrene resin being produced. Because some of the conjugated diene polymer 30 is essentially pushed out of the continuous phase into the dispersed phase, in some embodiments, the globules can increase in particle size as a result of the added first conjugated diene polymer 30 to the dispersed phase. Additional monovinylarene components, such as the second monovinylarene component described herein, can be added during the reaction of the emulsion 42. As the concentration of the first conjugated diene polymer 30 continues to grow within the dispersed phase and decreases in the continuous phase, phase inversion of the first conjugated diene polymer 30 occurs. Phase inversion of the first conjugated diene polymer 30 typically occurs during the step of reacting the emulsion 42 to polymerize the monovinylarene component.

Numerous process variables can be changed in the process 10 of making the high impact polystyrene 90, particularly when more than one reactor is used. For example, the emulsion 42 can be supplied to more than one reactor. The emulsion 42 can be supplied to any of the reactors. As another example, the step of reacting the emulsion 42 with the second monovinylarene component 22 can include supplying the second monovinylarene component 22 to more than one of the reactors to polymerize the first and second monovinylarene components 20, 22. Alternatively, the second monovinylarene component 22 can be supplied to any one of the reactors to polymerize the first and second monovinylarene components 20, 22.

To assist in the polymerization reaction of the first and second monovinylarene components 20, 22, the process 10 can further include combining an additive 45 with the emulsion 42. Example additives 45 that are useful in the synthesis of high impact polystyrene 90 include plasticizers, chain transfer agents, initiators, impact enhancement agents, solvents, or combinations thereof. Organosilanes are examples of impact enhancement agents that can be used to increase the impact strength of high impact polystyrenes. An example initiator can include a peroxyester initiator. Other suitable additives that are useful in producing high impact polystyrene 90 will be apparent to those of skill in the art and are to be considered within the scope of the present invention. The additives 45 can be added to the emulsion 42 after the emulsion 42 has been formed. For example, as shown in FIG. 1, the additives 45 can be sent to any reactor used to produce the high impact polystyrene 90.

In another embodiment, a plasticizer is used as the additive 45. The use of the plasticizer in the process 10 helps to improve the impact strength of the resultant high impact polystyrene 90. The plasticizer can be added at any point in the process 10 so as to ensure that it is mixed well with the high impact polystyrene 90. Suitable plasticizers for the present invention include mineral oil, polybutenes, styrene dimers, styrene trimers, or combinations thereof. In an embodiment, the amount of plasticizer in the final high impact polystyrene 90 is less than 10 wt. %; alternatively, from 1 wt. % to 8 wt. %; alternatively, from 1 wt. % to 5 wt. %; or alternatively, from 2 wt. % to 4 wt. %, based on the total weight of the high impact polystyrene 90 produced.

To further customize or control the impact strength and other properties of the high impact polystyrene 90, the first monovinylarene component can be polymerized in the presence of both the emulsion 42 and a traditional HIPS feedstock syrup to produce the high impact polystyrene 90 of the present invention. Typically, in most high impact polystyrene processes, polybutadiene and styrene monomer are combined in a tank where the styrene essentially dissolves the polybutadiene to produce a clear liquid, which is called the feedstock syrup. The feedstock syrup is then sent to a first reactor within a series of reactors to allow the styrene monomer to be polymerized to form the traditional high impact polystyrene. In an aspect, the present process 10 can include polymerizing a mixture of a feedstock syrup of a second conjugated diene polymer, a third monovinylarene component, and a fourth monovinylarene component beyond phase inversion of the first conjugated diene polymer and supplying the resultant composition to any one of the reactors, along with the emulsion 42, to polymerize the first, third, and fourth monovinylarene components. In some embodiments, the first and second conjugated diene polymers 30 are different. In some embodiments, the first, third, and fourth monovinylarene components 20 include styrene.

In an embodiment of the present invention, the first monovinylarene component 20, the monovinylarene-conjugated diene block copolymer 25, and the first conjugated diene polymer 30 in the form of the emulsion 42 are fed to a first reaction zone along with the second monovinylarene component 22. The first reaction zone can be located in the first reactor 65 or any of the subsequent reactors 70, 75, 80 or any combination of the reactors. Polymerization is initiated either thermally or chemically. Chemical initiators can be any organic peroxide. In an embodiment, the initiator can be tert-butyl peroxybenzoate or tert-butyl peroctoate. The degree of polymerization in the first reaction zone can range from 1% to 50%; alternatively, from 3% to 25%; alternatively, from 5% to 20%; alternatively, from 5% to 15%; or alternatively, from 5% to 12%. The first reaction zone allows for optional grafting of the first or second monovinylarene component to the first conjugated diene polymer 30 or the monovinylarene-conjugated diene block copolymer 25.

Optionally, a chain transfer agent can also be added to the first reaction zone, or any of the subsequent reaction zones, to facilitate free radical transfer. Any of the chain transfer agents known in the art are acceptable for use in this process 10. In an embodiment, the chain transfer agent is ethylbenzene, alpha methyl styrene, dodecylmercaptan, terpinolene, or combinations thereof. Terpinolene is the common name of 4-(1-methyl-1-ethylidene)-1-methyl-1-cyclohexene.

In an alternate embodiment, a reactor effluent stream 52 from the final reaction zone is allowed to flow to one or more finishing reactors 80 prior to devolatilization. The finishing reactor 80 is operated to allow the polymerization of the monovinylarene components to proceed nearer to completion. The degree of polymerization in the alternative embodiment finishing reactor is in a range of from 50% to 95%; alternatively, from 70% to 90%; alternatively, from 75% to 85%, etc.

Still a further alternative is to have at least two finishing reactors. The degree of polymerization in the last of at least two finishing reactors is 75% to 90%; or alternatively, from 82% to 90%.

During the polymerization process, residual or unreacted monovinylarene components, ethylbenzene, styrene dimers, styrene trimers, and other impurities can be present in the unvolatilized high impact polystyrene 54 and high impact polystyrene 90. In some embodiments, the residual impurities can be removed after the reaction is complete. In some embodiments, the step of removing the residual impurities comprises devolatilizing the reactor effluent stream 54, such as by utilizing a two-step devolatilization process as shown in FIG. 1 utilizing a static mixer 56 and devolatilization equipment 85a, 85b as is understood by those of skill in the art. When the static mixer 56 is used, the finishing reactor effluent stream 54 is sent to the static mixer 56. The static mixer discharge stream 58 can be sent to a first devolatilizer 85a. Steam can be added to the first devolatilizer stream 62 to assist with the further devolatilization of stream 62. The first devolatilizer discharge stream 62 can then be sent to the second devolatilizer 85b. The second devolatilizer discharge stream 90 contains the devolatilized high impact polystyrene 90. Other suitable impurity removal processes will be apparent to those of skill in the art and are to be considered within the scope of the present invention.

Once the high impact polystyrene 90 is formed, polymer additives can be added to the high impact polystyrene. Other additives, fillers, and reinforcing agents can also be added to the high impact polystyrene. Such additives can include UV absorbers, stabilizers, anti-oxidants, mold release agents, dyes, pigments, wax, mineral oil, flame retardants, etc. and combinations thereof. Suitable reinforcing agents can include glass fibers. Other suitable additives, fillers, and reinforcing agents will be apparent to those of skill in the art and are to be considered within the scope of the present invention.

The high impact polystyrene 90 can be used to form pellets. In some embodiments, the process 10 can further include forming a molded article from the pellets.

The Conjugated Diene Polymer

The conjugated diene polymer can be polybutadiene, polyisoprene, poly-2-chloro-1,3-butadiene, poly-1-chloro-1,3-butadiene, ethylene/propylene terpolymer, butadiene/acrylonitrile copolymer, butyl rubber, acrylic rubber, styrene/isobutylene/butadiene copolymer, isoprene/acrylic ester copolymer, or combinations thereof. A separate polystyrene can be grafted to the conjugated diene polymer to some extent prior to use or can be used simply in its homopolymer form. In certain embodiments, the conjugated diene polymer can be polybutadiene rubber. Other conjugated diene polymers that can be useful in the present invention include polyisoprenes. In some embodiments, a polybutadiene polymer, which is predominantly in the cis configuration, can be useful in the present invention. As an example, it can be desirable to have at least 90% of the polybutadiene polymer in the cis configuration (e.g., 95%). Suitable polybutadienes for use in the present invention are Diene® polybutadienes from Firestone Polymers, LLC, and Asadene polybutadienes from Asahi Kasei Chemicals Corporation. In other embodiments, a branched polybutadiene polymer can be useful in the present invention. Suitable branched polybutadienes for use in the present invention are Asaprene™ 720AX, 730AX, or 760AX polybutadienes from Asahi Kasei Chemicals Corporation.

The viscosity of the conjugated diene polymer can vary depending on the particular properties desired in the high impact polystyrene. The viscosities described herein are measured as a 5 wt. % solution in a solvent, preferably toluene or styrene. In some embodiments, the viscosity of a 5 wt. % solution of the conjugated diene polymer is greater than 100 centipoise; alternatively, greater than 200 centipoise; alternatively, greater than 500 centipoise; alternatively, greater than 1000 centipoise, etc. In alternative embodiments the viscosity of a 5 wt. % solution of the conjugated diene polymer is less than 20 centipoise; alternatively, less than 10 centipoise, etc.

The Feedstock Emulsion

In one aspect, the present invention provides a feedstock emulsion. In some embodiments, the emulsion comprises from about 60 wt. % to about 99 wt. % first monovinylarene component, about 0.5 wt. % to about 8 wt. % monovinylarene-conjugated diene block copolymer, and about 1 wt. % to about 30 wt. % conjugated diene polymer, based upon the total weight of the emulsion. In some embodiments, the monovinylarene-conjugated diene block copolymer of the emulsion has a monovinylarene component content of greater than 50 wt. %. The emulsion has a continuous phase and a dispersed phase. The continuous phase comprises at least a portion of the first monovinylarene component and at least a portion of the conjugated diene polymer. The dispersed phase comprises at least a portion of the monovinylarene-conjugated diene block copolymer, a remaining of the first monovinylarene component, and a remaining portion of the conjugated diene polymer. The dispersed phase comprises globules that are suspended within the continuous phase. The globules are believed to have an average globule particle size in a range of about 0.01 microns to about 50 microns; or alternatively, about 0.01 microns to about 50 microns; or alternatively, from about 0.1 microns to about 25 microns; or alternatively, from about 0.1 microns to about 20 microns. In some embodiments, the average globule particle size is believed to be in a range of about 0.9 micron to about 1.2 micron. In solutions having a 5 wt. % monovinylarene component, the average globule particle size is believed to be in a range of about 0.2 micron to about 0.4 micron. The monovinylarene-conjugated diene block copolymer is believed to act as an emulsifier to form the globules within the feedstock emulsion, as described herein.

As used herein, "emulsion" is generally defined as a composition comprising both a continuous phase and an immiscible discontinuous phase dispersed as globules therein, with or without an emulsifier, along with one common solvent for both phases. The continuous phase can be liquid in nature, polymeric in nature, or a solvated polymer. The continuous phase employed in the emulsion described herein is not aqueous. The discontinuous phase can be liquid in nature, polymeric in nature, or a solvated polymer. As used herein, "immiscible" is defined as being unable to form a stable homogenous mixture. As used herein, the term "emulsion" does not refer to conventional emulsion polymerizations wherein a hydrophobic monomer or monomer mixture is dispersed in a continuous aqueous phase using an oil-in-water emulsifier followed by polymerization with a water-soluble free-radical initiator. Nor is the use of an inverse emulsion polymerization considered, wherein a hydrophilic monomer in aqueous solution is dispersed within a continuous organic phase using a water-in-oil emulsifier using oil-soluble or water-soluble initiators.

As used herein, "globules" are generally defined as small masses, such as small drops of liquid. The globules do not have a specific shape associated with them. The globules can be substantially spherical, egg-shaped, capsule-shaped, droplet-shaped, round, or similarly shaped. Other suitable shapes will be apparent to those of skill in the art and are to be considered within the scope of the present invention. In some embodiments, the globules can be included in the domains contained within the high impact polystyrene. In some embodiments, however, the domains can be formed during the polymerization process and do not originate from the globules contained with the emulsion.

Figure 2:
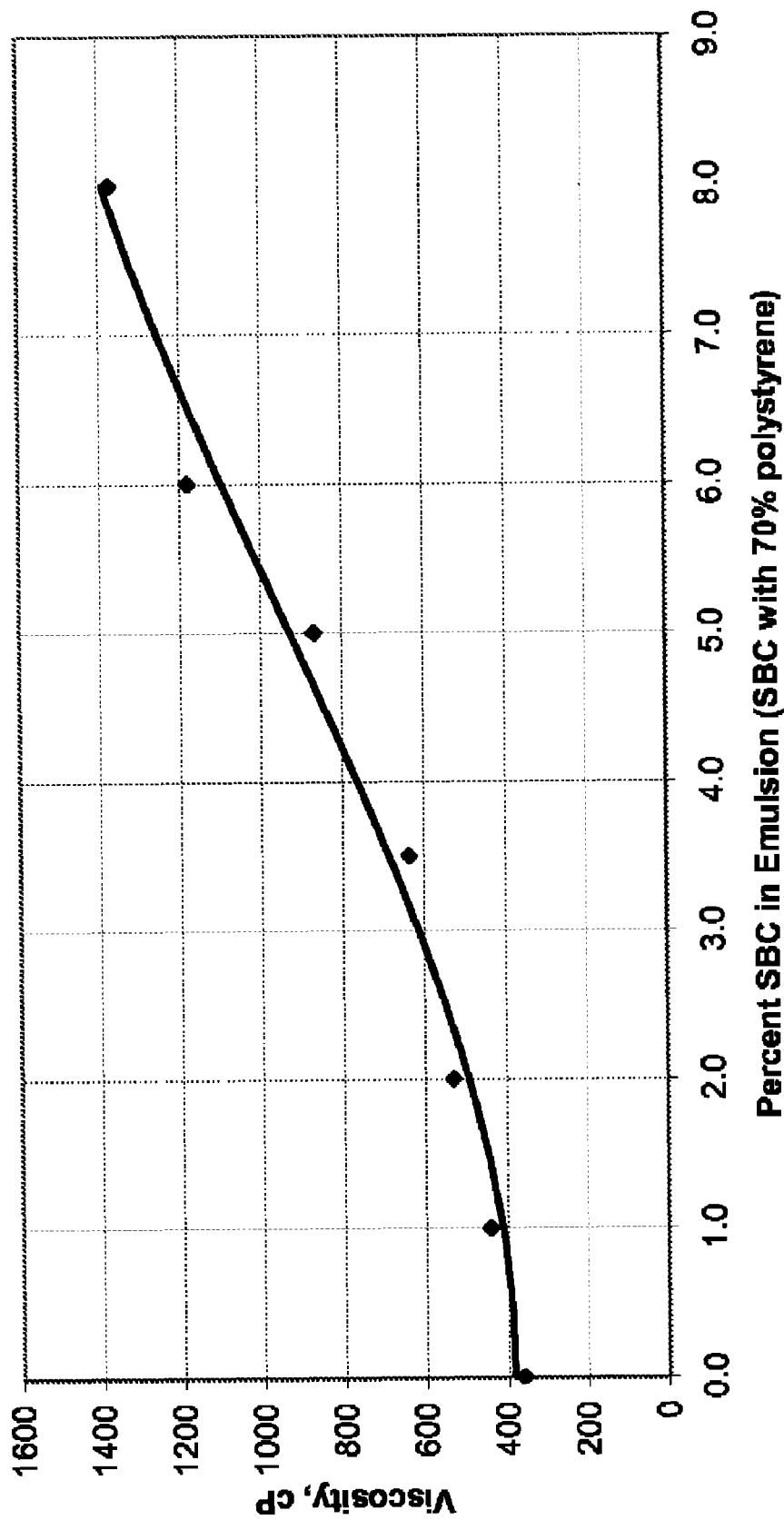
FIG. 2 is a graph showing the viscosity of the emulsion plotted as a function of the amount of the monovinylarene-conjugated diene block copolymer (SBC) contained therein in accordance with an embodiment of the present invention.

In some embodiments, the feedstock emulsion can have a viscosity of lower than about 50,000 centipoises (cP) at room temperature that depends upon the total polymeric materials contained within the feedstock emulsion. FIG. 2 shows various viscosity readings of emulsions using a monovinylarene-conjugated diene block copolymer (SBC) having 70% monovinylarene component (polystyrene) contained therein. The viscosity of the feedstock emulsion can be controlled by several methods, as described herein.

As an embodiment of the present invention, a method of making the feedstock emulsion is also provided. To make the emulsion, the monovinylarene component, the monovinylarene-conjugated diene block copolymer, and the conjugated diene polymer are combined. The monovinylarene-conjugated diene block copolymer that is used can have a monovinylarene component content that is greater than 50 wt. %.

The emulsion that is formed by adding the first monovinylarene component, the monovinylarene-conjugated diene block copolymer, and the first conjugated diene polymer is generally a cloudy, viscous liquid. In one embodiment, when the monovinylarene-conjugated diene block copolymer is combined at a ratio of less than about 25 wt. % monovinylarene-conjugated diene block copolymer to about 75 wt % conjugated diene polymer, very small globules or particles formed that were dispersed within the continuous phase of the conjugated diene polymer and first conjugated monovinylarene component, resulting in cloudiness. As the ratio increased over about 25 wt. % monovinylarene-conjugated diene block copolymer to about 75 wt % conjugated diene polymer, at least a portion of the monovinylarene-conjugated diene block copolymer and the first monovinylarene component coalesced to form a heavier layer, while the conjugated diene polymer and a remaining portion of the monovinylarene-conjugated diene block copolymer formed a clear, lighter layer. An interface layer also formed between the heavier layer and the clear, lighter layer when the ratio was increased over about 25 wt. % monovinylarene-conjugated diene block copolymer to about 75 wt % conjugated diene polymer.

While not wishing to be bound by theory, it is believed that the monovinylarene-conjugated diene block copolymer serves as an emulsifier in a solution of the first monovinylarene component and the conjugated diene polymer to form globules or particles, which further adsorb the monovinylarene-conjugated diene block copolymer and the conjugated diene polymer into the globules. The belief that the monovinylarene-conjugated diene block copolymer acts as an emulsifier is due to the monovinylarene-conjugated diene block copolymer containing both conjugated diene blocks and monovinylarene blocks. In much the same way as the hydrophilic and hydrophobic portions of detergents interact with the respective aqueous and organic phases of a traditional aqueous emulsion, it is believed that the conjugated diene blocks interact with the conjugated diene polymer and the monovinylarene blocks interact with the monovinylarene polymer.

In some embodiments, the emulsion generally has a composition that comprises from about 60 wt. % to about 99 wt. % first monovinylarene component, about 0.5 wt. % to about 8 wt. % monovinylarene-conjugated diene block copolymer, and about 1 wt. % to about 30 wt. % first conjugated diene polymer. In some instances, a weight ratio of the monovinylarene-conjugated diene block copolymer to the first conjugated diene polymer is used to prepare or form the emulsion. The weight ratio can be up to about 30 wt. %.

As an example, once the emulsion is formed, the globules can comprise up to 20 wt. % of the emulsion. The globules could typically have an average globule particle size in a range of about 0.01 microns to about 50 microns; or alternatively, from about 0.1 microns to about 25 microns; or alternatively, from about 0.1 microns to about 20 microns. In some embodiments, the average globule particle size can vary outside of this range. In some embodiments the average globule particle size can be less than 50 microns; alternatively, from less than 25 microns; alternatively, from less than 20 microns; alternatively, from less than 15 microns; alternatively, from less than 10 microns; etc. In alternative embodiments, the average globule particle size can be greater than 25 microns; alternatively, from greater than 30 microns; alternatively, from greater than 40 microns; alternatively, from greater than 50 microns; etc.

It is believed that the feedstock emulsion of the present invention can be used in the copolymerization of a monovinylarene component with other monomers. In some embodiments, for example, the feedstock emulsion is expected to benefit the polymerization of styrene and acrylonitrile in the presence of polybutadiene or polybutadiene copolymers to produce acrylonitrile-butadiene-styrene polymers (ABS). Other polymerization processes that the feedstock emulsion could be used in will be apparent to those of skill in the art and are to be considered within the scope of the present invention.

Feedstock Additive

As another embodiment, a feedstock additive for a styrene polymerization reaction is provided. The feedstock additive comprises the first conjugated diene polymer and the monovinylarene-conjugated diene block copolymer. The monovinylarene-conjugated diene block copolymer used to form the feedstock additive has a monovinylarene content of greater than 50 wt. %. The components of the feedstock additive are described herein. It is believed that the feedstock additive can be also used in other polymerization processes as will be apparent to those of skill in the art.

The Monovinylarene-Conjugated Diene Block Copolymer

A "monovinylarene-conjugated diene block copolymer" is a polymer comprising monovinylarene content or units and conjugated diene content or units. The monovinylarene-conjugated diene block copolymer comprises one or more blocks, wherein each block comprises monovinylarene units, conjugated diene units, or both. Any particular block can comprise either or both monovinylarene units or conjugated diene units. If a block comprises only one type of unit, it can be termed a "monoblock." If a block comprises both, it can be a random block, a tapered block, or a stepwise block. The monovinylarene-conjugated diene copolymer can comprise at least one monovinylarene-conjugated diene tapered block. In certain embodiments, the monovinylarene-conjugated diene block copolymer can comprise at least two or three consecutive monovinylarene-conjugated diene tapered blocks. The monovinylarene-conjugated diene copolymer can comprise at least one conjugated diene monoblock.

A block is "tapered" when both (a) the mole fraction of conjugated diene units in a first section of the block is higher than the mole fraction of conjugated diene units in a second section of the block, wherein the second section of the block is closer to a given end of the block and (b) condition (a) is true for substantially all sections of the block. Depending on the size of the sections being considered, condition (a) may not be true for all sections, but if so, will be not true at no more than about the level expected by chance. Though not wishing to be bound by theory, it is believed that the inclusion of tapered blocks within an SBC can provide similar properties to a non-tapered SBC having a greater conjugated diene polymer content.

A block is "stepwise" when a first section of the block contains substantially all monovinylarene units of the block and a second section of the block contains substantially all conjugated diene units of the block. In light of the above definition, the first section is not necessarily prior to the second section in time, space, or any other parameter.

A block is "random" when the mole fractions of conjugated diene units and monovinylarene units in a section of the block are substantially the same as the mole fractions of conjugated diene units and monovinylarene units in the entire block. This does not preclude the possibility of sections of the block having regularity (i.e., appearing non-random), but such regular sections will typically be present at no more than about the level expected by chance.

As examples, exemplary structures of various monovinylarene component-conjugated diene block copolymer resins can be represented by the following model formulas:

| | |
|---|---|
| S-i-i-S-B-i-S-B-X | 1. |
| i-S-i-S-B-i-S-B-X | 2. |
| S-i-S-i-S-i-B-X | 3. |
| S-i-i-S-(B/S)-(B/S)-(B/S)-X | 4. |
| S-i-i-S-(B/S)-(B/S)-X | 5. |
| S-i-i-S-(B/S)-i-S-X | 6. |
| S-i-i-S-(B/S)-i-B-X | 7. |
| i-(B/S)$_n$ | 8. |
| i-(B/S)$_n$-S | 9. |
| i-B-(B/S)$_n$; | 10. |
| i-[S-(B/S)]$_n$ | 11. |
| i-(B/S)-[S-(B/S)]$_n$ | 12. |

In these formulas, i represents a monoalkali metal initiator, S represents a block having polymerized monovinylarene component, B represents an elastomeric block having polymerized conjugated diene, and (S/B) represents an elastomeric block chain having copolymerized monovinylarene component and conjugated diene, in which the elastomeric block can be described as random block, or a tapered block.

Generally, each block is formed by polymerizing the monovinylarene component or mixture of monovinylarene components from which the desired units of the block are derived. The polymerization process can be carried out in a hydrocarbon diluent at any suitable temperature in the range of from about −100° C. to about 150° C., such as from about 0° C. to about 150° C., and at a pressure sufficient to maintain the reaction mixture substantially in the liquid phase. In one embodiment, the hydrocarbon diluent can be a linear or cyclic paraffin, or combinations thereof. Exemplary linear or cyclic paraffins include, but are not limited to, pentane, hexane, octane, cyclopentane, cyclohexane, or combinations thereof, among others. In one embodiment, as an example, the paraffin is cyclohexane. The polymerization process can be carried out in the substantial absence of oxygen and water, such as under an inert gas atmosphere.

In addition to the sequence of addition of the monomers and of the initiator, it is important to control the amount of each monomer and initiator addition under each sequence above at each increment so that a suitable proportion of block sizes and proportion of polymodality is obtained in each mode. It is feasible to adjust the time interval over which the addition of one or more of the increments of initiator and/or the input of the appropriate monovinylarene monomer charge occurs; further tailoring the polymodality of the resulting product upon coupling.

The relative amount of conjugated diene and monovinylarene in the monovinylarene-conjugated diene block copolymer can vary depending on the particular characteristics desired. In some embodiments, the monovinylarene content of the block copolymer will be from about 55 wt. % to about 90 wt. %. In other embodiments, the monovinylarene content can be from about 58 wt. % to about 80 wt. %. In further embodiments, the monovinylarene content can be from about 58 wt. % to about 70 wt. %. In general, the monovinylarene content of the block copolymer is greater than 50 wt. %; alternatively, greater than about 55 wt. %, etc. Suitable monovinylarene-conjugated diene block copolymers can also include bimodal tapered copolymers with at least 30 wt. % blocky styrene content (e.g., up to 50% or higher).

In the present invention, the monovinylarene-conjugated diene block copolymers can be polymodal or multimodal, that is, a population of block copolymer molecules can have two or more peaks in a histogram of the population's molecular weight distribution, or it can be monomodal, that is, a population of block copolymer molecules can have one peak in a histogram of the population's molecular weight distribution. For example, suitable multimodal monovinylarene-conjugated diene block copolymers can include trimodal, bimodal, etc. monovinylarene-conjugated diene block copolymers.

The monovinylarene-conjugated diene block copolymer can have a blocky monovinylarene content of at least 30 wt. % blocky styrene content (e.g., up to 50% or higher). The blocky monovinylarene content is defined as the weight of monovinylarene units whose two nearest adjoining units on the polymer chain are both monovinylarene units, divided by the total weight of monovinylarene units in the copolymer, with the quotient expressed as a percentage. The blocky monovinylarene content can be measured by H-1 NMR, as described in more detail in the Examples contained herein.

The polymerization process used to produce the monovinylarene-conjugated diene block copolymer can be performed in the presence of a monoalkali metal initiator. In one embodiment, the monoalkali metal initiator can be any organomonoalkali metal compound known for use as an initiator. In a further embodiment, the monoalkali metal initiator can have the formula RM, wherein R is an alkyl, cycloalkyl, or aryl radical containing 4 to 8 carbon atoms, such as an n-butyl radical, and M is an alkali metal, such as lithium. In a particular embodiment, the monoalkali metal initiator is n-butyl lithium. Other monoalkali metal initiators can also be used, including but not limited to methyllithium, ethyllithium, propyllithium, sec-butyl lithium, t-butyl lithium, and hexyl lithium. The initiator can be added prior to, or after the monomer charge for a particular block.

The amount of monoalkali metal initiator employed can depend upon the desired polymer or block molecular weight, as is known in the art and is readily determinable, making due allowance for traces of reaction poisons in the feed streams.

The monovinylarene-conjugated diene block copolymer polymerization process can further involve the inclusion of small amounts of randomizers. In one embodiment, the randomizer can be a polar organic compound, such as an ether, a thioether, or a tertiary amine. In another embodiment, the randomizer can be a potassium salt or a sodium salt of an alcohol. The randomizer can be included in the hydrocarbon diluent to improve the effectiveness of the monoalkali metal initiator, to randomize at least part of the monovinylarene monomer in a mixed monomer charge, or both. The inclusion of a randomizer can be of value when forming a random or tapered monovinylarene-conjugated diene block of the present polymer.

Exemplary randomizers include, but are not limited to, dimethyl ether, diethyl ether, ethyl methyl ether, ethyl propyl ether, di-n-propyl ether, di-n-octyl ether, anisole, dioxane, 1,2-dimethoxyethane, 1,2-diethoxypropane, dibenzyl ether, diphenyl ether, 1,2-dimethoxybenzene, tetrahydrofuran, potassium tert-amylate, dimethyl sulfide, diethyl sulfide, di-n-propyl sulfide, di-n-butyl sulfide, methyl ethyl sulfide, dimethylethylamine, tri-n-ethylamine, tri-n-propylamine, tri-n-butylamine, trimethylamine, triethylamine, tetramethylethylenediamine, tetraethylethylenediamine, pyridine, N,N-di-methylaniline, N-methyl-N-ethylaniline, N-methylmorpholine, and combinations thereof, among others.

When forming a particular block, each monovinylarene component charge or monovinylarene component mixture charge can be polymerized under solution polymerization conditions such that the polymerization of each monovinylarene component charge or monovinylarene component mixture charge, to form the particular block, is substantially complete before charging a subsequent charge. "Charging," as used herein, refers to the introduction of a compound to a reaction zone, such as the interior of a reactor vessel.

Though not wishing to be bound by theory, if a monoalkali metal initiator is included in a charge, a block will typically form either de novo or by addition to the end of an unterminated, previously-formed, block. Further not wishing to be bound by theory, if a monoalkali metal initiator is not included in a charge, a block will typically only form by addition to the end of an unterminated, previously-formed, block.

A coupling agent can be added after polymerization of the monovinylarene-conjugated diene block copolymer is complete. Suitable coupling agents include, but are not limited to, di- or multivinylarene compounds; di- or multiepoxides; di- or multiisocyanates; di- or multialkoxysilanes; di- or multiimines; di- or multialdehydes; di- or multiketones; alkoxytin compounds; di- or multihalides, such as silicon halides and halosilanes; mono-, di-, or multianhydrides; di- or multiesters, such as the esters of monoalcohols with polycarboxylic acids; diesters that are esters of monohydric alcohols with dicarboxylic acids; diesters that are esters of monobasic acids with polyalcohols such as glycerol; or combinations of two or more such compounds, among others.

Useful multifunctional coupling agents include, but are not limited to, epoxidized vegetable oils such as epoxidized soybean oil, epoxidized linseed oil, or combinations thereof, among others. In one embodiment, the coupling agent is epoxidized soybean oil. Suitable epoxidized vegetable oils are commercially available under the trade name Vikoflex™ from Arkema Chemicals in Paris, France.

If coupling is to be performed, any effective amount of the coupling agent can be employed. In one embodiment, a stoichiometric amount of the coupling agent relative to active polymer alkali metal tends to promote maximum coupling. However, more or less than stoichiometric amounts can be used for varying coupling efficiency where desired for particular products. While the monovinylarene-conjugated diene block copolymers disclosed herein are generally coupled materials, it will be appreciated that non-coupled materials can also be used, and it is generally also possible to configure a non-coupled monovinylarene-conjugated diene block copolymer to approximate the structure and properties of a different, coupled monovinylarene-conjugated diene block copolymer, and vice versa.

In some embodiments, the monovinylarene-conjugated diene block copolymer can be a styrene-butadiene copolymer. Such materials are commercially available, for example as K-Resin® styrene-butadiene copolymers from Chevron Phillips Chemical Company LP.

Suitable monovinylarene-conjugated diene copolymers and methods for their production are well-known in the art. Examples of suitable copolymers and methods for their production are disclosed in U.S. Pat. Nos. 4,091,053; 4,584,346; 4,704,435; 5,545,690; 5,910,546; 6,096,828; 6,265,484; 6,265,485; 6,420,486; and 6,444,755, which are incorporated herein by reference.

"Monovinylarene," as used herein, refers to an organic component containing a single carbon-carbon double bond, at least one aromatic moiety, and a total of 8 to 18 carbon atoms, such as 8 to 12 carbon atoms. Exemplary monovinylarenes include, but are not limited to, styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, or combinations thereof. In one embodiment, the monovinylarene is styrene. A unit of polymer, wherein the unit is derived from polymerization of a monovinylarene monomer, is a "monovinylarene unit."

Other suitable types of monovinylarene-conjugated diene block copolymers that are capable of forming the emulsion described herein will be apparent to those of skill in the art and are to be considered within the scope of the present invention.

"Conjugated diene," as used herein, refers to an organic compound containing conjugated carbon-carbon double bonds and a total of 4 to 12 carbon atoms, such as 4 to 8 carbon atoms. Exemplary conjugated dienes include, but are not limited to, 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, or combinations thereof. In one embodiment, the conjugated diene can be 1,3-butadiene or isoprene. A unit of polymer, wherein the unit is derived from polymerization of a conjugate diene monomer, is a "conjugated diene unit." As an example, the conjugated diene polymer can have a molecular weight in a range of about 100,000 gram/mole to about 300 gram/mole.

High Impact Polystyrene

As another embodiment of the present invention, a high impact polystyrene is provided. The high impact polystyrene is prepared using a process that comprises combining the first monovinylarene component, the monovinylarene-conjugated diene block copolymer, and the first conjugated diene polymer to form the emulsion having globules contained therein, as described herein. The emulsion comprises globules having at least a portion of the monovinylarene-conjugated diene block copolymer, at least a portion of the first monovinylarene component, and at least a portion of the first conjugated diene polymer. The optional second monovinylarene component is then optionally added to the emulsion and then the first and optional second monovinylarene components are polymerized to produce the high impact polystyrene. The second monovinylarene component is not required. In an aspect, the high impact polystyrene can have a monovinylarene-conjugated diene block copolymer content in a range of about 0.5 wt. % to about 5 wt. %. Alternatively, the monovinylarene-conjugated diene block copolymer content ranges from about 2 wt. % to about 3 wt. %.

In another aspect, the high impact polystyrene comprises globules that have been grafted within the high impact polystyrene during polymerization of the first and optional second monovinylarene components. In yet another aspect, the high impact polystyrene can have a weight ratio of monovinylarene-conjugated diene block copolymer to conjugated diene polymer of up to 30 wt. %.

In some embodiments, the high impact polystyrene can have an average domain particle size of the monovinylarene-conjugated diene block copolymer and the conjugated diene polymer of about 0.01 microns to about 50 microns; or alternatively, from about 0.1 microns to about 25 microns; or alternatively, from about 0.1 microns to about 20 microns. In an aspect, the high impact polystyrene can have a domain size distribution of the monovinylarene-conjugated diene block copolymer and the conjugated diene polymer that can be bimodal.

The high impact polystyrene composition comprises domains of a monovinylarene-conjugated diene block copolymer with a conjugated diene polymer. The particle size distribution of the domains in the high impact polystyrene produced by the methods described herein are generally narrower than many traditional high impact polystyrenes. Traditional high impact polystyrenes generally have a 1-2-4 domain size distribution. In some embodiments, the high impact polystyrene of the present invention can have a 1-2-3 domain size distribution, which is narrower than the traditional 1-2-4 domain size distribution based upon the ratio of a 10% value to a 50% value and to a 90% value of the cumulative distribution of the domain particle size on the basis of the domain particle volume, i.e. a 1-2-4 ratio size distribution for 10%, 50%, and 90% accumulative volume particle size values. Example domain size particle distribution values can be found in the tables located in the Example Section contained herein.

The domain size distribution can also be expressed as a ratio of a 5% value to a 95% value of the cumulative distribution of the particle size on the basis of the particle volume. As an example, in some embodiments, this ratio can be less than 3. In other embodiments, this ratio can be from 3 to 45, and in yet other embodiments, this ratio can be greater than 45. Alternatively, the ratio can be from 3 to 15; or alternatively, the ratio can be greater than 15.

The domains present in the high impact polystyrene can be present in a number of morphologies, including cellular morphologies, coil morphology, capsule morphologies, elongated capsule, etc. In an embodiment the high impact polystyrene contains predominantly cellular morphologies. In an alternative embodiment, the high impact polystyrene contains predominantly elongated capsule morphologies. In an alternative embodiment, the high impact polystyrene contains predominantly cellular morphologies and elongated capsule morphologies. In an alternative embodiment, the high impact polystyrene contains predominantly capsule morphologies.

High Impact Polystyrene Properties

As yet another embodiment of the present invention, a high impact polystyrene composition having a 60 degree angle gloss for plaques molded at 150° F. in a range of about 90% to about 100% and a tensile yield strength in a range of about 3800 psi to about 5500 psi is provided.

In some embodiments, the high impact polystyrene of the present invention possesses high gloss properties, particularly when compared with traditional high impact polystyrene having comparable tensile properties. As can be seen in Table 3, in some embodiments, the high impact polystyrene has a 60 degree angle gloss in a range of about 95 to about 105 for plaques molded at 150° F. The high impact polystyrene has a 60 degree angle gloss in a range of about 85 to about 100 for plaques molded at 100° F. The high impact polystyrene has a 20 degree angle gloss in a range of about 80 to about 100 for plaques molded at 150° F. The high impact polystyrene has a 20 degree angle gloss in a range of about 50 to about 85 for plaques molded at 100° F. The 60 degree gloss values can be seen in the graphs in FIGS. 4 and 5.

Besides having good gloss properties, the high impact polystyrene also possesses good tensile properties, particularly when compared with other high impact polystyrenes having similar gloss properties. As shown in Tables 2 and 5, the high impact polystyrene has a tensile yield in a range of about 3800 psi to about 5500 psi. The high impact polystyrene has a tensile rupture in a range of about 2600 psi to about 4200 psi. The high impact polystyrene has a tensile elongation in a range of about 15% to about 45%.

Figure 4:
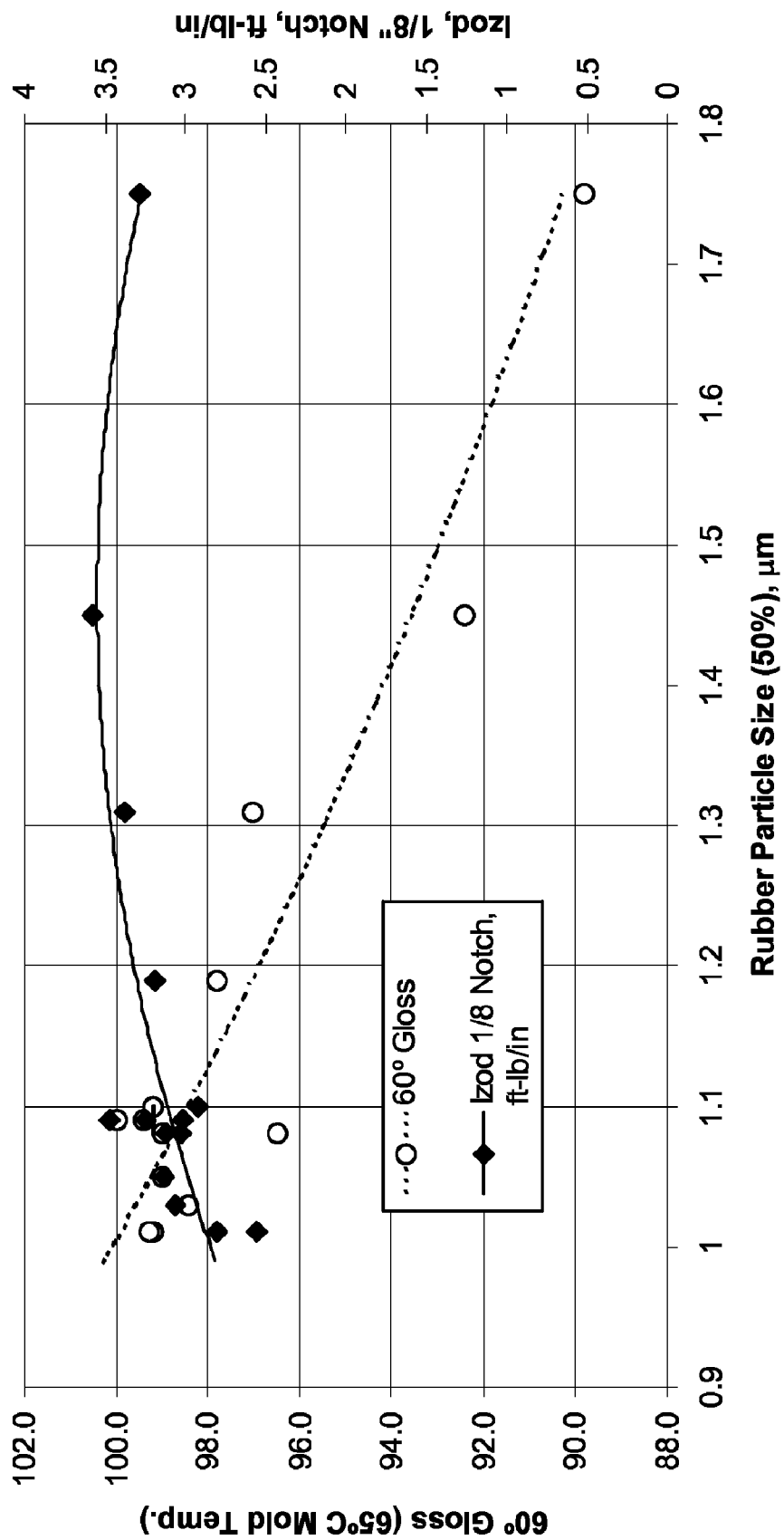
FIG. 4 is a graph showing the gloss and notch Izod data of a high impact polystyrene produced at a 12 wt. % rubber ratio in accordance with an embodiment of the present invention.
Figure 5:
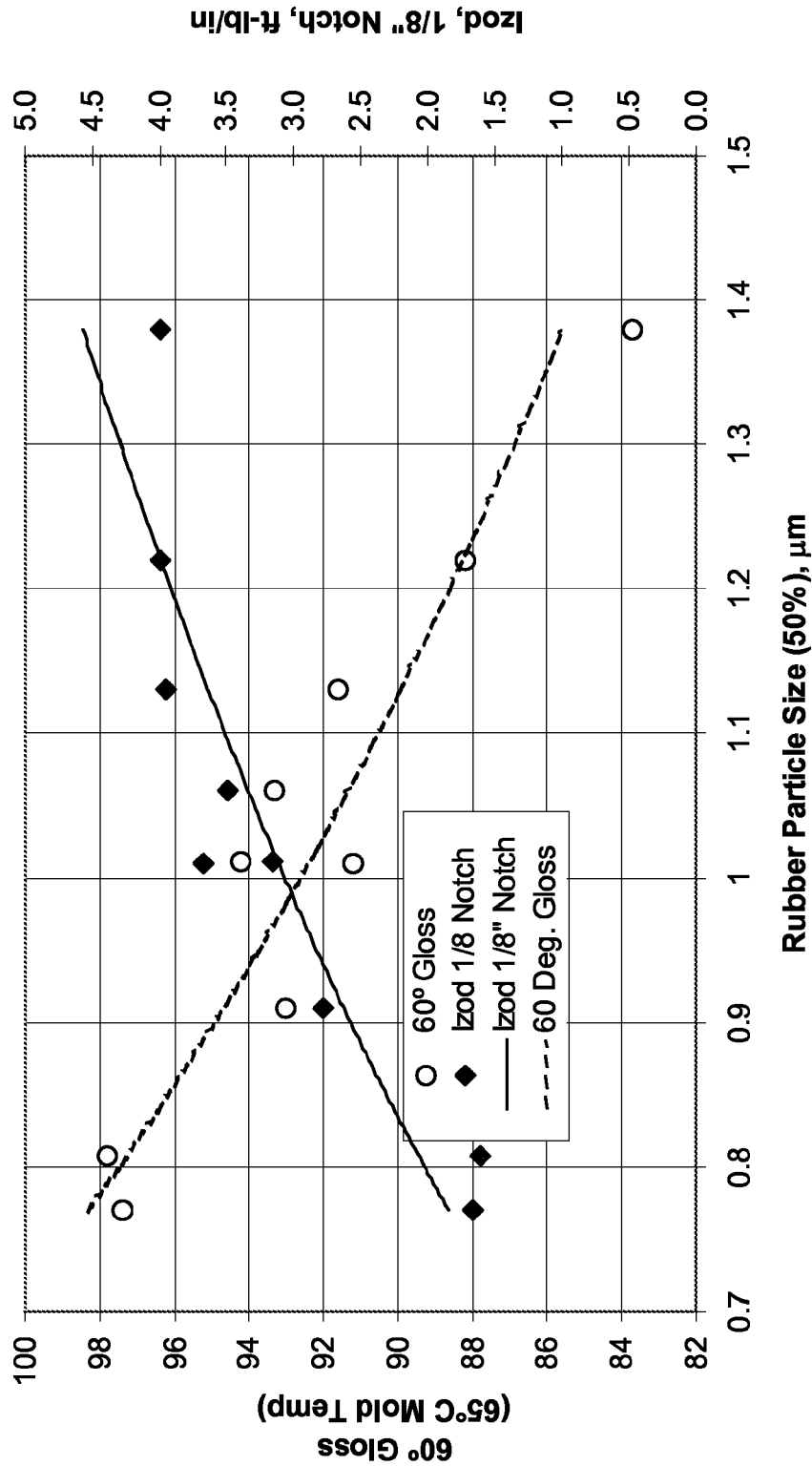
FIG. 5 is a graph showing the gloss and notch Izod data of a high impact polystyrene produced at a 14 wt. % rubber ratio in accordance with an embodiment of the present invention.

In addition to good gloss and tensile properties, the high impact polystyrene of the present invention also has good impact properties. The gloss can be varied without detrimentally affecting the impact properties of the high impact polystyrene. Even at high gloss values, the high impact polystyrene of the present invention maintains good impact properties. As shown in Tables 2, 5, 7, 10, and 13, the high impact polystyrene has a ⅛" notch Izod in a range of about 0.50 ft-lb/inch to about 8 ft-lb/inch; or alternatively, from about 0.50 ft-lb/inch to about 4.5 ft-lb/inch; or alternatively, from about 0.50 ft-lb/inch to about 2.5 ft-lb/inch. At a domain size distribution at 50% at various conjugated diene polymer concentrations, as shown in FIGS. 4 and 5, the ⅛" notch Izod is in a range of about 1.0 ft-lb/inch to about 4.5 ft-lb/inch. The high impact polystyrene has an instrumented impact maximum load energy in a range of about 2.5 ft-lb to about 20 ft-lb. The high impact polystyrene has an instrumented impact total energy in a range of about 3.5 ft-lb to about 25 ft-lb.

The high impact polystyrene has a number average molecular weight ($M_n$) value in a range of about 70,000 gram/mole to about 150,000 gram/mole. The high impact polystyrene has a weight average molecular weight ($M_w$) value in a range of about 180,000 gram/mole to about 350,000 gram/mole. The high impact polystyrene has a z-average molecular weight ($M_z$) value in a range of about 350,000 gram/mole to about 550,000 gram/mole. The high impact polystyrene has a polydispersity index in a range of about 2.2 to about 3.0; or alternatively, in a range of about 2.35 to about 2.85. The high impact polystyrene has a $M_z/M_n$ value in a range of about 3.5 to about 5.5. The polydispersity index, which indicates the breadth of the molecular weight distribution and is the equivalent to the weight-average molecular weight of a polymer divided by the number-average molecular weight of the polymer (i.e., $M_w/M_n$).

Articles Produced with the High Impact Polystyrene Composition

The high impact polystyrene composition can be used to form various articles. For example, the high impact polystyrene composition can be used to make telephones, house wares, refrigerator parts, lawn and garden tools, kitchen appliances, electronics housings, toys, window pieces, packaging articles, beverage containers, or medical parts or devices.

The high impact polystyrene composition can be formed into such articles by one or more well-known methods, such as milling, extrusion, blow molding, or injection molding.

As another embodiment of the present invention, a high impact polystyrene is provided. In this embodiment, the high impact polystyrene comprises domains of the monovinylarene-conjugated diene block copolymer with the first conjugated diene polymer and the first monovinylarene component. In an aspect of the present invention, a molded article comprising the high impact polystyrene is provided.

EXAMPLES

ASTM methods were applied to all property tests for resin samples of the examples, unless stated otherwise. MFR is the melt flow rate of the resin samples, and was measured at 200° C. under 5 kg weight load according to ASTM method D1238. Melt flow data is reported in units of mg/min. Tensile strength at Yield, Rupture, and Tensile Elongation at break were measured according to ASTM method D638 for the molded samples of the polymer resins. Vicat is a softening temperature or a softening point at which a polymer can no longer support a useful load with time. Vicat was measured according to ASTM method D1525, rate B, using molding samples of ¼" thick bars. Notch Izod is a measurement of impact resistance for polymers and was determined according to ASTM method D256 at room temperature using ⅛" molded bars. Instrumented impact is a measurement of impact resistance for polymers and was determined according to ASTM method D3763 at room temperature using molded plaques having a 4" diameter and ⅛" thickness.

The $M_w$ and the $M_n$ and molecular weight distributions were determined by gel permeation chromatography (GPC) in tetrahydrofuran using polystyrene standards. Results are given in gram/mole.

The high impact polystyrene of the present invention has a Swell Index in a range of about 7.5% to about 12%. The Swell Index, as used herein, describes the measure of the conjugated diene polymer that was crosslinked during devolatilization of the high impact polystyrene. The Swell Index test is an indirect measurement of the degree (or level) that the conjugated diene polymer molecules are cross-linked to form a network of conjugated diene polymer molecules. The lower the Swell Index, the greater percent of the conjugated diene polymer being crosslinked. Similarly, the higher the Swell Index, the lower the degree of the conjugated diene polymer cross-linking. If the conjugated diene polymer is over cross-linked or under cross-linked, the impact strength of the polymer is adversely affected. The Swell Index is determined by weighing an amount of the high impact polystyrene to be tested and exposing this sample to a 50 wt. % methyl ethyl ketone in acetone solution at ambient temperatures for sixteen hours with gentle agitation. The sample is then centrifuged for several hours until a clear top phase is obtained. The top phase is decanted and the bottom phase containing the conjugated diene polymer is dried and carefully weighed. Toluene is then introduced to the sample and agitated. The toluene is then quickly decanted from the remaining conjugated diene polymer gel and an amount of gel is weighed, then carefully dried, and weighed. The Swell Index is the difference between these two measurements divided by the weight of the dried gel.

The particle morphological picture of the domains of the monovinylarene-conjugated diene block copolymer and the conjugated diene polymer is determined using Transmission Electron Microscopy (TEM) of ultra-thin slices of the materials. The average sizes for the particle types are measured separately. Therefore, the cell particles and the single occlusion particles are all treated independently. These particle types have distinctively different appearances that are recognizable in the TEM image.

Particle size measurements referred to in this application are average volume particle sizes as determined by a particle size analyzer, Beckman Coulter L230, based upon laser diffraction techniques. The sample was made into a dispersion using a mixture of methyl ethyl ketone and acetone. The alternate measurement method also referred to below was not used for the measurements given in this invention but is effectively equivalent for spherical particles.

Particle size measurement is accomplished by (1) overlaying a transparency containing straight lines on a TEM photograph of the high impact polystyrene resin, (2) measuring the total length of the line segments contained inside particles of a given type, and (3) counting the number of particles intersected. This process is repeated for as many lines as is necessary to give a reasonably good statistical average. The following formula is then used to calculate average particle size:

$$\text{Average particle size} = \frac{\text{total length of segments bisected}}{\text{number of particles intersected}}$$

This method calculates an average particle size for all particles, including non-spherical particles.

A reference that describes the measurement methods used herein is *Quantitative Microscopy* by R. T. Dehoff and F. N. Rhines, Techbooks, 1968, which is incorporated herein by reference.

The "rubber ratio" as used herein is a measure of the amount of monovinylarene-conjugated diene block copolymer and conjugated diene polymer introduced as a weight percentage of the total monovinylarene monomer in the polymerization.

Blocky monovinylarene content (or monovinylarene blockiness), as stated above, is the proportion of the monovinylarene units of a polymer whose two nearest adjoining units in the polymer chain are both monovinylarene units. The monovinylarene blockiness is determined after using H-1 NMR to measure two experimental quantities as follows.

The total number of monovinylarene units (i.e. arbitrary instrument units which cancel out when ratioed) is first determined by integrating the total monovinylarene aromatic signal in the H-1 NMR spectrum from 7.5 to 6.2 ppm and dividing this quantity by x, wherein x is the number of hydrogen atoms on the arene ring.

The blocky monovinylarene units are then determined by integrating that portion of the aromatic signal in the H-1 NMR spectrum from the signal minimum between 6.88 and 6.80 to 6.2 ppm and dividing this quantity by, e.g., 2 to account for the 2 ortho hydrogens on each blocky styrene aromatic ring (or other divisor, routinely determined by the skilled artisan and depending on the monovinylarene units known to be in the polymer). The assignment of this signal to the two ortho hydrogens on the rings of those styrene units which have two styrene nearest adjoining units was reported in F. A. Bovey, *High Resolution NMR of Macromolecules* (Academic Press, New York and London, 1972), chapter 6. The monovinylarene blockiness is simply the percentage of blocky monovinylarene to total monovinylarene units:

$$\text{Blocky monovinylarene \%} = \frac{\text{Blocky Monovinylarene Units}}{\text{Total Monovinylarene Units}} \times 100$$

Example 1

Samples 1 through 15 were prepared using the Polymerization Properties shown in Table 1. A styrene solution containing 8, 11, or 14 weight % of a 80/20 weight ratio of polybutadiene available commercially as Diene® 55AC10 by Firestone Polymers, LLC and a styrene butadiene block copolymer, wherein the polybutadiene is found primarily in monoblocks available commercially as K-Resin® SBC KK 38 by Chevron Phillips Chemical Company LP, were both supplied and essentially dissolved in styrene monomer at room temperature. The solution was warmed to 70° C. and was fed continuously to a stirred tank reactor. Also added to this feed was toluene, at a rate of 0.95 lb/hr, and mineral oil, at a rate of 1.2 lb/hr. The reaction was initiated with 150, 225, or 300 ppmw (parts per million by weight of reactants charged) of an organic peroxy initiator being added to the feed at a rate of 0.5 lb/hr. Finally, a chain transfer agent, terpinolene, was added to the feed at a rate of 0.4 lb/hr. The flow into and out of the first CSTR reactor was equal, and the level was maintained such that the average residence time was about 1.2 to 2.0 hours. The temperature of the second CSTR reactor was maintained at 135° C., 138° C., or 140° C. The residence time for the second CSTR reactor was about 1.0 to 1.5 hours. The resulting effluent solution from the second CSTR was fed continuously to a third CSTR reactor at a temperature from about 150 to 175° C., at an average residence time of about 1.0 to 1.5 hours. The effluent from the third CSTR reactor was then fed to a fourth CSTR reactor operated at a temperature of from about 150° C. to 175° C., with an average residence time of about 1.0 to 1.5 hours. Mineral oil was added to the fourth CSTR at an amount to give about 0.5 to 4.0 weight % in the final HIPS, if needed. The polymerization was finished up to a monomer conversion level of about 80 to 90% of the total monomer feed. Residual monomer was removed by using conventional means.

FIG. 2 shows a comparison of the HIPS resin produced in accordance with Example 1, which is on the right side of the figure, with a conventional HIPS on the left side of the figure that was prepared by the polymerization of styrene in the presence of polybutadiene past phase inversion. The domains within the HIPS resin are smaller and more narrowly spaced than the domains contained within the conventional HIPS.

Tables 2 and 3 show the property data of the HIPS resin from Example 1. A good balance between high gloss, high impact, and high tensile properties was obtained. The high gloss is indicative of the small and more narrowly spaced domains contained in the sample HIPS resins

TABLE 1

Polymerization Variables for Example 1

| Sample | Conjugated Diene Solids (wt. %) | Organic Peroxy Initiator (ppmw) | Second CSTR Temperature (° C.) |
|---|---|---|---|
| 1 | 11 | 225 | 138 |
| 2 | 14 | 225 | 135 |
| 3 | 8 | 225 | 140 |
| 4 | 8 | 150 | 138 |
| 5 | 11 | 300 | 140 |
| 6 | 11 | 150 | 140 |
| 7 | 14 | 225 | 140 |
| 8 | 11 | 150 | 135 |
| 9 | 11 | 225 | 138 |
| 10 | 14 | 300 | 138 |
| 11 | 8 | 300 | 138 |
| 12 | 8 | 225 | 135 |
| 13 | 11 | 300 | 135 |
| 14 | 14 | 150 | 137.5 |
| 15 | 11 | 225 | 137.5 |

TABLE 2

Tensile and Impact Results for Example 1

| | Tensile | | | Izod | Instrumented Impact | |
|---|---|---|---|---|---|---|
| | | | | ⅛" | Energy | Total |
| Sample | Yield (psi) | Rupture (psi) | Elongation (%) | Notch (ft-lb/inch) | Maximum Load (ft-lb) | energy (ft-lb) |
| 1 | 4171 | 3042 | 34 | 2.75 | 13.0 | 14.7 |
| 2 | 4195 | 2970 | 17 | 3.86 | 18.9 | 22.4 |
| 3 | 4933 | 3604 | 35 | 1.33 | 3.4 | 6.2 |
| 4 | 4586 | 3560 | 33 | 2.02 | 6.7 | 12.4 |
| 5 | 4675 | 3317 | 21 | 2.71 | 14.2 | 16.3 |
| 6 | 4073 | 3184 | 38 | 2.98 | 9.8 | 13.1 |
| 8 | 4381 | 3281 | 36 | 2.68 | 11.4 | 14.4 |
| 9 | 4288 | 3275 | 38 | 2.67 | 12.1 | 15.6 |
| 10 | 5345 | 3605 | 32 | 0.57 | 3.6 | 5.1 |
| 11 | 4891 | 3644 | 39 | 1.25 | 3.0 | 4.0 |
| 12 | 4595 | 3306 | 27 | 1.66 | 3.6 | 11.1 |
| 14 | 4208 | 3020 | 26 | 3.84 | 19.4 | 23.0 |
| 15 | 4365 | 3242 | 42 | 2.87 | 12.5 | 14.7 |

TABLE 3

Gloss, Swell Index, and GPC Results for Example 1

| | Gloss | | | | | Molecular Weight (GPC) | | | |
|---|---|---|---|---|---|---|---|---|---|
| Sample | 20° @ 100° F. | 60° @ 100° F. | 20° @ 150° F. | 60° @ 150° F. | Swell (%) | $M_n$ (kg/mol) | $M_w$ (kg/mol) | $M_z$ (kg/mol) | $M_w/M_n$ |
| 1 | 60 | 91 | 90 | 99 | 8.86 | 80 | 199 | 358 | 2.49 |
| 2 | 68 | 94 | 90 | 100 | 7.67 | 76 | 197 | 365 | 2.59 |
| 3 | 73 | 96 | 93 | 101 | 8.29 | 82 | 203 | 358 | 2.47 |
| 4 | 60 | 91 | 91 | 100 | 8.29 | 81 | 203 | 362 | 2.56 |
| 5 | 71 | 95 | 93 | 101 | 9.07 | 78 | 200 | 362 | 2.50 |
| 6 | 56 | 90 | 90 | 99 | 8.90 | 78 | 203 | 372 | 2.60 |
| 8 | 64 | 93 | 86 | 98 | 8.18 | 77 | 202 | 367 | 2.62 |
| 9 | 61 | 92 | 89 | 99 | 8.72 | 78 | 201 | 365 | 2.58 |
| 10 | 77 | 97 | 98 | 102 | 8.13 | 83 | 204 | 359 | 2.46 |
| 11 | 76 | 96 | 96 | 101 | 9.47 | 80 | 202 | 358 | 2.53 |
| 12 | 71 | 95 | 94 | 101 | 9.53 | 79 | 201 | 366 | 2.54 |
| 14 | 61 | 92 | 86 | 98 | 8.60 | 73 | 204 | 391 | 2.79 |
| 15 | 63 | 92 | 90 | 100 | 8.05 | 75 | 201 | 370 | 2.68 |

Example 2

Examples 1 through 15 were prepared using the Polymerization Properties shown in Table 4. A styrene solution containing 8, 11, or 13 weight % of a 80/20 weight ratio of polybutadiene available commercially as Diene® 55AC10 from Firestone Polymers, LLC, and a styrene butadiene block copolymer available commercially as K-Resin® SBC KRDEV020 from Chevron Phillips Chemical Company LP, wherein butadiene is found primarily in tapered blocks, were both essentially dissolved in styrene monomer at room temperature. The solution was warmed to 70° C. and was fed continuously to a stirred tank reactor. Also added to this feed was toluene, at a rate of 0.95 lb/hr, and mineral oil, at a rate of 1.2 lb/hr. The reaction was initiated by an organic peroxy initiator, added to the feed at a rate of 0.5 lb/hr. Finally, a chain transfer agent, terpinolene, was added to the feed at a rate of 0.4 lb/hr. The flow into and out of the first CSTR reactor was equal, and the level was maintained such that the average residence time was about 1.2 to 2.0 hours. The temperature of the second CSTR reactor was maintained at about 125-145° C. The residence time for the second CSTR reactor was about 1.0 to 1.5 hours. The resulting effluent solution from the second CSTR was fed continuously to a third CSTR reactor at a temperature from about 150 to 175° C., at an average residence time of about 1.0 to 1.5 hours. The effluent from the third CSTR reactor was then fed to a fourth CSTR reactor operated at a temperature of from about 150° C. to 175° C., with an average residence time of about 1.0 to 1.5 hours. Mineral oil was added in the final reactor at an amount to give about 0.5 to 4.0 weight % in the final HIPS, if needed. The polymerization was finished up to a styrene monomer conversion level of about 80 to 90% of the total monomer feed. Residual styrene monomer was removed by using conventional means.

TABLE 4

Polymerization Variables for Example 2

| Sample | Conjugated Diene Solids (wt. %) | Organic Peroxy Initiator (ppmw) | Second CSTR Temperature (° C.) |
|---|---|---|---|
| 1 | 8 | 150 | 137.5 |
| 2 | 8 | 300 | 137.5 |
| 3 | 8 | 225 | 135.0 |
| 4 | 8 | 225 | 140.0 |
| 5 | 11 | 225 | 137.5 |
| 6 | 11 | 150 | 135.0 |
| 7 | 11 | 225 | 137.5 |
| 8 | 11 | 300 | 135.0 |
| 9 | 11 | 150 | 140.0 |
| 10 | 11 | 300 | 140.0 |
| 11 | 11 | 225 | 137.5 |
| 12 | 13 | 150 | 137.5 |
| 13 | 13 | 300 | 137.5 |
| 14 | 13 | 225 | 135.0 |
| 15 | 13 | 225 | 140.0 |

The properties of the resulting HIPS resins are shown in Table 5.

TABLE 5

Tensile and Impact Results for Example 2

| | Tensile | | | Izod |
|---|---|---|---|---|
| Sample | Yield (psi) | Rupture (psi) | Elongation (%) | ⅛" Notch (ft-lb/inch) |
| 1 | 4875 | 3789 | 51 | 2.53 |
| 2 | 5424 | 3870 | 20 | 0.71 |
| 3 | 5200 | 3725 | 24 | 2.10 |
| 4 | 5075 | 3694 | 36 | 2.42 |
| 5 | 4727 | 3374 | 27 | 3.00 |
| 6 | 4737 | 3337 | 30 | 2.70 |
| 7 | 4446 | 3219 | 35 | 3.09 |
| 8 | 4351 | 3302 | 41 | 3.09 |
| 9 | 4256 | 3169 | 30 | 2.97 |
| 10 | 4636 | 3379 | 18 | 2.42 |
| 11 | 4535 | 3278 | 24 | 2.71 |
| 12 | 4407 | 3429 | 41 | 3.49 |
| 14 | 4599 | 3298 | 19 | 2.18 |
| 16 | 5211 | 4136 | 41 | 2.10 |
| 17 | 5606 | 4365 | 50 | 2.00 |
| 18 | 5584 | 4326 | 36 | 1.90 |
| 19 | 4615 | 3286 | 19 | 2.14 |

Example 3

Samples 1 through 19 were prepared using the Polymerization Properties shown in Table 6. A styrene solution containing 8, 11, or 13 weight % of a 80/20 or a 90/10 weight ratio of polybutadiene available commercially as Diene® 55AC10 from Firestone Polymers, LLC, and a styrene butadiene block copolymer available commercially as K-Resin® SBC KK38 from Chevron Phillips Chemical Company LP, wherein butadiene is found primarily in tapered blocks, were both essentially dissolved in styrene monomer at room temperature. The solution was warmed to 70° C. and was fed continuously to a stirred tank reactor. Also added to this feed was toluene, added at a rate of 0.95 lb/hr, and mineral oil, at a rate of 1.2 lb/hr. The reaction was initiated by an organic peroxy initiator, added to the feed at a rate of 0.5 lb/hr. Finally, a chain transfer agent, terpinolene, was added to the feed at a rate of 0.4 lb/hr. The temperature of the first CSTR was set between 95° C. and 100° C., as shown in Table 6. The flow into and out of the first CSTR reactor was equal, and the level was maintained such that the average residence time was about 1.2 to 2.0 hours. The temperature of the second CSTR reactor was maintained at about 130-145° C. The residence time for the second CSTR reactor was about 1.0 to 1.5 hours. The resulting effluent solution from the second CSTR was fed continuously to a third CSTR reactor at a temperature from about 150 to 175° C., at an average residence time of about 1.0 to 1.5 hours. The effluent from the third CSTR reactor was then fed to a fourth CSTR reactor operated at a temperature of from about 150° C. to 175° C., with an average residence time of about 1.0 to 1.5 hours. Mineral oil was added in the final reactor at an amount to give about 0.5 to 4.0 weight % in the final HIPS, if needed. The polymerization was finished up to a styrene monomer conversion level of about 80 to 90% of the total monomer feed. Residual styrene monomer was removed using conventional means.

TABLE 6

Polymerization Variables for Example 3

| Sample | First CSTR Temperature (° C.) | Polybutadiene/ Styrene Butadiene Block Copolymer Ratio | Organic Peroxy Initiator (ppmw) | Second CSTR Temperature (° C.) |
|---|---|---|---|---|
| 1 | 95 | 20 | 225 | 135 |
| 2 | 95 | 20 | 225 | 135 |
| 3 | 95 | 20 | 225 | 135 |
| 4 | 95 | 20 | 225 | 135 |
| 5 | 95 | 20 | 225 | 135 |
| 6 | 95 | 20 | 225 | 135 |
| 7 | 95 | 20 | 225 | 135 |
| 8 | 97 | 20 | 225 | 135 |
| 9 | 100 | 20 | 225 | 135 |
| 10 | 100 | 20 | 150 | 135 |
| 11 | 100 | 20 | 150 | 140 |
| 12 | 100 | 20 | 225 | 140 |
| 13 | 95 | 20 | 225 | 140 |
| 14 | 95 | 20 | 150 | 135 |
| 15 | 95 | 20 | 150 | 135 |
| 16 | 95 | 10 | 150 | 140 |
| 17 | 95 | 10 | 225 | 135 |
| 18 | 100 | 10 | 225 | 135 |
| 19 | 100 | 10 | 150 | 140 |

TABLE 7

Tensile and Impact Results for Example 3

| Sample | Gloss (60° @ 150° F.) | Tensile Yield (psi) | Tensile Rupture (psi) | Tensile Elongation (%) | Izod 1/8" Notch (ft-lb/inch) |
|---|---|---|---|---|---|
| 1 | 94 | 5240 | 4172 | 48 | 2.02 |
| 2 | 94 | 5349 | 4230 | 45 | 2.1 |
| 3 | 95 | 5358 | 4390 | 48 | 2.18 |
| 4 | 96 | 5382 | 4372 | 41 | 2.06 |
| 5 | 94 | 5164 | 4204 | 41 | 2.02 |
| 6 | 96 | 5061 | 4093 | 46 | 2.08 |
| 7 | 93 | 4950 | 4002 | 51 | 2.1 |
| 8 | 96 | 5193 | 4047 | 45 | 2.06 |
| 9 | 99 | 5534 | 4230 | 40 | 1.92 |
| 10 | 97 | 5289 | 4240 | 45 | 2.1 |
| 11 | 96 | 5169 | 4133 | 42 | 2.1 |
| 12 | 97 | 5648 | 4357 | 44 | 2 |
| 13 | 94 | 5349 | 4274 | 46 | 2.06 |
| 14 | 90 | 4958 | 4225 | 46 | 2.02 |
| 15 | 92 | 5058 | 4355 | 51 | 1.98 |
| 16 | 69 | 4166 | 3931 | 51 | 2.06 |
| 17 | 73 | 4352 | 3987 | 47 | 2.06 |
| 18 | 97 | 5243 | 4084 | 39 | 2.1 |
| 19 | 81 | 4505 | 4031 | 51 | 2.16 |

The physical properties and particle size distribution of the resulting HIPS resins are shown in Tables 7 and 8.

TABLE 8

Particle Size Distribution Results for Example 3

| Sample | Total Rubber Solids Content (wt. %) | Rubber Particle Size (RPS) at 10% (μm) | RPS at 50% (μm) | RPS at 90% (μm) |
|---|---|---|---|---|
| 1 | 7.19 | 0.66 | 1.35 | 1.94 |
| 2 | 7.07 | 0.66 | 1.21 | 1.74 |
| 3 | 7.00 | 0.66 | 1.30 | 1.90 |
| 4 | 6.80 | 0.70 | 1.30 | 1.80 |
| 5 | 7.20 | 0.70 | 1.50 | 2.10 |
| 6 | 7.10 | 0.70 | 1.40 | 1.90 |
| 7 | 7.00 | 0.70 | 1.50 | 2.10 |
| 8 | 7.00 | 0.60 | 1.10 | 1.60 |
| 9 | 7.10 | 0.50 | 0.90 | 1.40 |
| 10 | 6.90 | 0.72 | 1.20 | 1.70 |
| 11 | 7.00 | 0.72 | 1.40 | 1.90 |
| 12 | 7.00 | 0.50 | 0.87 | 1.50 |
| 13 | 6.90 | 0.58 | 1.22 | 1.92 |
| 14 | 7.03 | 1.15 | 2.08 | 3.46 |
| 15 | 7.15 | 1.09 | 1.95 | 3.20 |
| 16 | 7.72 | 2.16 | 4.69 | 8.76 |
| 17 | 7.79 | 1.85 | 4.15 | 7.93 |
| 18 | 7.59 | 0.57 | 1.07 | 1.66 |
| 19 | 7.46 | 1.43 | 3.11 | 6.27 |

Example 4

Samples 1 through 20 were prepared using the Polymerization Properties shown in Table 9. 8, 11, or 13 weight % of a 80/20 or a 90/10 weight ratio of polybutadiene available commercially as Diene® 55AC10 from Firestone Polymers, LLC, and a styrene butadiene block copolymer available commercially as K-Resin® SBC KK 38 from Chevron Phillips Chemical Company LP, wherein butadiene is found primarily in monoblocks, were both fed to a first reactor in two separate feed streams. In the reactor, the essentially dissolved in styrene monomer at room temperature. Also added to this feed was toluene, added at a rate of 0.95 lb/hr, and mineral oil, at a rate of 1.2 lb/hr. The reaction was initiated by an organic peroxy initiator, added to the feed at a rate of 0.5 lb/hr. Finally, a chain transfer agent, terpinolene, was added to the feed at a rate of 0.4 lb/hr. The flow into and out of the first CSTR reactor was equal, and the level was maintained such that the average residence time was about 1.2 to 2.0 hours. The temperature of the second CSTR reactor was maintained at about 125-145° C. The residence time for the second CSTR reactor was about 1.0 to 1.5 hours. The resulting effluent solution from the second CSTR was fed continuously to a third CSTR reactor at a temperature from about 150 to 175° C., at an average residence time of about 1.0 to 1.5 hours. The effluent from the third CSTR reactor was then fed to a fourth CSTR reactor operated at a temperature of from about 150° C. to 175° C., with an average residence time of about 1.0 to 1.5 hours. Mineral oil was added in the final reactor at an amount to give about 0.5 to 4.0 weight % in the final HIPS, if needed. The polymerization was finished up to a styrene monomer conversion level of about 80 to 90% of the total monomer feed. Residual styrene monomer was removed by using conventional means.

TABLE 9

Polymerization Variables for Example 4

| Sample | First CSTR Temperature (° C.) | Polybutadiene/ Styrene Butadiene Block Copolymer Ratio | Organic Peroxy Initiator (ppmw) | Second CSTR Temperature (° C.) |
|---|---|---|---|---|
| 1 | 100 | 20 | 225 | 135 |
| 2 | 100 | 20 | 225 | 135 |
| 3 | 100 | 20 | 225 | 135 |
| 4 | 100 | 20 | 150 | 135 |
| 5 | 100 | 20 | 150 | 135 |

TABLE 9-continued

Polymerization Variables for Example 4

| Sample | First CSTR Temperature (° C.) | Polybutadiene/ Styrene Butadiene Block Copolymer Ratio | Organic Peroxy Initiator (ppmw) | Second CSTR Temperature (° C.) |
|---|---|---|---|---|
| 6 | 100 | 20 | 150 | 140 |
| 7 | 100 | 20 | 150 | 140 |
| 8 | 100 | 20 | 225 | 140 |
| 9 | 100 | 20 | 225 | 140 |
| 10 | 95 | 20 | 225 | 140 |
| 11 | 95 | 20 | 225 | 140 |
| 12 | 95 | 20 | 225 | 140 |
| 13 | 95 | 20 | 150 | 135 |
| 14 | 95 | 20 | 150 | 135 |
| 15 | 95 | 20 | 150 | 135 |
| 16 | 95 | 20 | 150 | 135 |
| 17 | 95 | 10 | 150 | 140 |
| 18 | 95 | 10 | 150 | 140 |
| 19 | 95 | 10 | 225 | 135 |
| 20 | 95 | 10 | 225 | 135 |

The physical properties and particle size distribution of the resulting HIPS resins are shown in Tables 10 and 11.

TABLE 10

Tensile and Impact Results for Example 4

| Sample | Gloss (60° @ 150° F.) | Tensile Yield (psi) | Tensile Rupture (psi) | Tensile Elongation (%) | Izod ⅛" Notch (ft-lb/inch) |
|---|---|---|---|---|---|
| 1 | 96 | 5495 | 4020 | 27 | 0.63 |
| 2 | 100 | 5485 | 4085 | 27 | 1.4 |
| 3 | 98 | — | — | — | 2.06 |
| 4 | 97 | 5348 | 4141 | 31 | 2.3 |
| 5 | 96 | — | — | — | 2.12 |
| 6 | 95 | 5192 | 4134 | 32 | 2.28 |
| 7 | 95 | — | — | — | 2.26 |
| 8 | 100 | 5607 | 4216 | 19 | 1.42 |
| 9 | 100 | — | — | — | 1.34 |
| 10 | 95 | 5345 | 3968 | 33 | 1.7 |
| 11 | 97 | 5478 | 4294 | 41 | 1.98 |
| 12 | 96 | — | — | — | 1.98 |
| 13 | 92 | 6912 | 5788 | 50 | 1.94 |
| 14 | 92 | — | — | — | 2.06 |
| 15 | 96 | 5181 | 4243 | 36 | 1.9 |
| 16 | 92 | — | — | — | 1.98 |
| 17 | 85 | 4396 | 4019 | 46 | 2.06 |
| 18 | 85 | — | — | — | 2.26 |
| 19 | 95 | 5002 | 4117 | 38 | 1.9 |
| 20 | 90 | — | — | — | 1.9 |

TABLE 11

Particle Size Distribution Results for Example 4

| Sample | Total Rubber Solids Content (wt. %) | RPS at 10% (μm) | RPS at 50% (μm) | RPS at 90% (μm) |
|---|---|---|---|---|
| 1 | 7.38 | 0.47 | 0.71 | 1.31 |
| 2 | 7.03 | 0.53 | 0.88 | 1.33 |
| 3 | 7.10 | 0.52 | 0.85 | 1.30 |
| 4 | 6.93 | 0.66 | 1.22 | 1.74 |
| 5 | 7.10 | 0.62 | 1.30 | 1.80 |
| 6 | 7.06 | 0.70 | 1.47 | 2.06 |
| 7 | 7.10 | 0.70 | 1.50 | 2.10 |
| 8 | 6.90 | 0.51 | 0.85 | 1.40 |
| 9 | 6.80 | 0.52 | 0.91 | 1.40 |
| 10 | 7.10 | 0.54 | 1.10 | 1.70 |
| 11 | 6.68 | 0.57 | 1.13 | 1.75 |
| 12 | 6.70 | 0.59 | 1.20 | 1.70 |
| 13 | 6.61 | 0.85 | 1.90 | 2.77 |
| 14 | 6.90 | 0.80 | 1.88 | 2.72 |
| 15 | 6.46 | 0.71 | 1.74 | 2.52 |
| 16 | 6.80 | 0.71 | 1.74 | 2.52 |
| 17 | 7.00 | 1.70 | 4.00 | 7.90 |
| 18 | 7.10 | 1.64 | 3.55 | 7.01 |
| 19 | 6.80 | 0.90 | 1.70 | 2.50 |
| 20 | 7.00 | 1.06 | 1.89 | 3.40 |

Example 5

Samples 1 through 34 were prepared using the Polymerization Properties shown in Table 12. 8, 11, or 13 weight % of a 80/20 weight ratio of polybutadiene available commercially as Diene® 55AC10 from Firestone Polymers, LLC, and a styrene butadiene block copolymer available commercially as K-Resin® SBC KK 38 from Chevron Phillips Chemical Company LP, wherein butadiene is found primarily in monoblocks, were both fed to a first reactor in two separate feed streams. In the reactor, the essentially dissolved in styrene monomer at room temperature. Also added to this feed was toluene, added at a rate of 0.95 lb/hr, and mineral oil, at a rate of 1.2 lb/hr. The reaction was initiated by an organic peroxy initiator, added to the feed at a rate of 0.5 lb/hr. Finally, a chain transfer agent, terpinolene, was added to the feed at a rate of 0.4 lb/hr. The flow into and out of the first CSTR reactor was equal, and the level was maintained such that the average residence time was about 1.2 to 2.0 hours. The temperature of the second CSTR reactor was maintained at about 125-145° C. The residence time for the second CSTR reactor was about 1.0 to 1.5 hours. The resulting effluent solution from the second CSTR was fed continuously to a third CSTR reactor at a temperature from about 160 to 175° C., at an average residence time of about 1.0 to 1.5 hours. The effluent from the third CSTR reactor was then fed to a fourth CSTR reactor operated at a temperature of from about 165° C. to 175° C., with an average residence time of about 1.0 to 1.5 hours. Mineral oil was added in the final reactor at an amount to give about 2.5 to 5.0 weight % in the final HIPS, if needed. The polymerization was finished up to a styrene monomer conversion level of about 80 to 90% of the total monomer feed. Residual styrene monomer was removed by using conventional means.

TABLE 12

Polymerization Variables for Example 5

| Sample | Terpinolene (ppmw) | Mineral Oil (wt. %) | Conjugated Diene Solids (wt. %) | Organic Peroxy Initiator (ppmw) | First CSTR Temperature (° C.) | Third CSTR Temperature (° C.) | Fourth CSTR Temperature (° C.) |
|---|---|---|---|---|---|---|---|
| 1 | 1200 | 4.0 | 8 | 225 | 100 | 170 | 175 |
| 2 | 1200 | 4.0 | 8 | 225 | 100 | 170 | 175 |
| 3 | 900 | 4.0 | 8 | 225 | 100 | 170 | 175 |
| 4 | 900 | 4.0 | 8 | 225 | 100 | 170 | 175 |
| 5 | 900 | 2.5 | 8 | 225 | 100 | 170 | 175 |
| 6 | 900 | 2.5 | 8 | 225 | 100 | 170 | 175 |
| 7 | 900 | 2.5 | 8 | 225 | 100 | 160 | 165 |
| 8 | 900 | 2.5 | 8 | 225 | 100 | 160 | 165 |
| 9 | 1200 | 2.5 | 10 | 225 | 100 | 170 | 175 |
| 10 | 1200 | 2.5 | 10 | 225 | 100 | 170 | 175 |
| 11 | 900 | 4.0 | 10 | 225 | 100 | 170 | 175 |
| 12 | 900 | 4.0 | 10 | 225 | 100 | 170 | 175 |
| 13 | 1200 | 4.0 | 10 | 225 | 100 | 160 | 165 |
| 14 | 1200 | 4.0 | 10 | 225 | 100 | 160 | 165 |
| 15 | 1200 | 2.5 | 10 | 225 | 100 | 160 | 165 |
| 16 | 1200 | 2.5 | 10 | 225 | 100 | 160 | 165 |
| 17 | 1200 | 4.0 | 10 | 225 | 100 | 170 | 175 |
| 18 | 1200 | 4.0 | 10 | 225 | 100 | 170 | 175 |
| 19 | 900 | 5.5 | 12 | 225 | 100 | 170 | 175 |
| 20 | 900 | 5.5 | 12 | 225 | 100 | 170 | 175 |
| 21 | 1200 | 5.5 | 12 | 275 | 97 | 170 | 175 |
| 22 | 1200 | 5.5 | 12 | 275 | 97 | 170 | 175 |
| 23 | 900 | 5.5 | 12 | 300 | 97 | 175 | 175 |
| 24 | 900 | 5.5 | 12 | 300 | 97 | 175 | 175 |
| 25 | 900 | 5.0 | 12 | 275 | 100 | 175 | 175 |
| 26 | 900 | 5.0 | 12 | 275 | 100 | 175 | 175 |
| 27 | 900 | 5.0 | 12 | 275 | 100 | 175 | 175 |
| 28 | 900 | 5.0 | 12 | 275 | 100 | 175 | 175 |
| 29 | 900 | 5.5 | 12 | 275 | 100 | 175 | 175 |
| 30 | 900 | 5.5 | 12 | 275 | 100 | 175 | 175 |
| 31 | 900 | 5.5 | 12 | 275 | 104 | 175 | 175 |
| 32 | 900 | 5.5 | 12 | 275 | 104 | 175 | 175 |
| 33 | 900 | 5 | 10.5 | 300 | 101 | 175 | 175 |
| 34 | 900 | 5 | 10.5 | 300 | 101 | 175 | 175 |

The physical properties and particle size distribution of the resulting HIPS resins are shown in Tables 13 and 14.

TABLE 13

Tensile and Impact Results for Example 5

| Sample | Gloss (60° @ 150° F.) | Tensile Yield (psi) | Tensile Rupture (psi) | Tensile Elongation (%) | Izod ⅛" Notch (ft-lb/inch) |
|---|---|---|---|---|---|
| 1 | 81 | 4311 | 3289 | 56 | 1.78 |
| 2 | 82 | 4141 | 3159 | 44 | 1.7 |
| 3 | 85 | 4457 | 3325 | 46 | 1.74 |
| 4 | 88 | — | — | — | 1.74 |
| 5 | 88 | 4717 | 3690 | 51 | 1.68 |
| 6 | 92 | — | — | — | 1.66 |
| 7 | 91 | 4753 | 3635 | 49 | 2.18 |
| 8 | 91 | — | — | — | 2.14 |
| 9 | 77 | 3790 | 3084 | 42 | 2.16 |
| 10 | 74 | — | — | — | 1.98 |
| 11 | 71 | 3825 | 3038 | 49 | 2.34 |
| 12 | 73 | — | — | — | 2.22 |
| 13 | 72 | 3577 | 2920 | 51 | 2.69 |
| 14 | 70 | — | — | — | 2.69 |
| 15 | 70 | 3599 | 3204 | 60 | 2.42 |
| 16 | 69 | — | — | — | 2.49 |
| 17 | 60 | 3565 | 2923 | 44 | 2.14 |
| 18 | 63 | — | — | — | 2.12 |
| 19 | 59 | 3529 | 2653 | 50 | 3.09 |
| 20 | 63 | — | — | — | 2.89 |
| 21 | 50 | 3164 | 2523 | 57 | 2.77 |
| 22 | 51 | — | — | — | 2.81 |
| 23 | 57 | 3390 | 2597 | 52 | 2.69 |
| 24 | 59 | — | — | — | 2.69 |
| 25 | 60 | 3572 | 2704 | 42 | 2.69 |
| 26 | 59 | — | — | — | 2.61 |
| 27 | 65 | 3450 | 2610 | 48 | 2.65 |
| 28 | 59 | — | — | — | 2.77 |
| 29 | 67 | 3261 | 2460 | 32 | 2.77 |
| 30 | 59 | — | — | — | 2.69 |
| 31 | 72 | 3319 | 2443 | 26 | 2.85 |
| 32 | 64 | — | — | — | 2.69 |
| 33 | 68 | 3462 | 2720 | 43 | 2.69 |
| 34 | 60 | 4311 | 3289 | 56 | 2.69 |

TABLE 14

Particle Size Distribution Results for Example 5

| Sample | Total Rubber Solids Content (wt. %) | RPS at 10% (μm) | RPS at 50% (μm) | RPS at 90% (μm) |
|---|---|---|---|---|
| 1 | 7.40 | 0.93 | 1.80 | 3.50 |
| 2 | 7.85 | 0.98 | 1.66 | 2.42 |
| 3 | 7.70 | 0.80 | 1.50 | 2.40 |

TABLE 14-continued

Particle Size Distribution Results for Example 5

| Sample | Total Rubber Solids Content (wt. %) | RPS at 10% (μm) | RPS at 50% (μm) | RPS at 90% (μm) |
|---|---|---|---|---|
| 4 | 7.68 | 0.70 | 1.41 | 2.09 |
| 5 | 7.20 | 0.85 | 1.6 | 2.60 |
| 6 | 7.12 | 0.80 | 1.53 | 2.30 |
| 7 | 7.50 | 0.70 | 1.30 | 1.90 |
| 8 | 7.50 | 0.74 | 1.30 | 2.20 |
| 9 | 9.18 | 1.23 | 2.61 | 5.25 |
| 10 | 9.00 | 1.20 | 2.60 | 5.40 |
| 11 | 9.50 | 1.08 | 2.28 | 4.66 |
| 12 | 9.10 | 1.10 | 2.20 | 4.30 |
| 13 | 9.40 | 1.20 | 2.70 | 5.50 |
| 14 | 9.80 | 1.20 | 2.50 | 5.00 |
| 15 | 9.50 | 1.60 | 3.30 | 6.40 |
| 16 | 9.30 | 3.40 | 3.40 | 6.60 |
| 17 | 9.80 | 3.20 | 3.20 | 6.10 |
| 18 | 9.40 | 3.20 | 3.20 | 6.20 |
| 19 | 11.50 | 1.90 | 1.90 | 3.60 |
| 20 | 12.04 | 1.94 | 1.94 | 3.97 |
| 21 | 11.60 | 2.60 | 2.60 | 5.30 |
| 22 | 11.65 | 2.52 | 2.52 | 5.03 |
| 23 | 11.40 | 2.32 | 2.32 | 5.09 |
| 24 | 11.60 | 2.30 | 2.30 | 5.08 |
| 25 | 11.70 | 2.05 | 2.05 | 4.30 |
| 26 | 11.69 | 2.13 | 2.13 | 4.39 |
| 27 | 11.43 | 1.99 | 1.99 | 4.13 |
| 28 | 11.70 | 2.07 | 2.07 | 4.26 |
| 29 | 11.56 | 2.17 | 2.17 | 4.44 |
| 30 | 11.66 | 2.04 | 2.04 | 4.14 |
| 31 | 11.39 | 1.87 | 1.87 | 3.53 |
| 32 | 11.75 | 1.87 | 1.87 | 3.61 |
| 33 | 10.27 | 2.57 | 2.57 | 5.05 |
| 34 | 9.67 | 2.28 | 2.28 | 4.41 |

While the invention has been shown or described in only some of its forms, it should be apparent to those skilled in the art that it is not so limited, but is susceptible to various changes without departing from the scope of the invention.

We claim:

1. A process of making a high impact polystyrene comprising the steps of:
    (a) combining a first monovinylarene component, a coupled multimodal monovinylarene-conjugated diene block copolymer, and a first conjugated diene polymer to form an emulsion comprising a continuous phase and a dispersed phase, the continuous phase comprising at least a portion of the first monovinylarene component and at least a portion of the first conjugated diene polymer, the dispersed phase comprising globules having at least a portion of the coupled multimodal monovinylarene-conjugated diene block copolymer, the dispersed phase being suspended within the continuous phase; and
    (b) polymerizing the first monovinylarene component in the presence of the emulsion to produce the high impact polystyrene.

2. The process of claim 1, further comprising the step of controlling a viscosity of the emulsion or the first conjugated diene polymer to control an average domain particle size of the high impact polystyrene.

3. The process of claim 2, wherein the step of controlling the viscosity of the emulsion comprises controlling an amount of the first conjugated diene polymer combined in the emulsion.

4. The process of claim 1, wherein the step of polymerizing the first monovinylarene component in the presence of the emulsion comprises grafting the globules with the first monovinylarene component during the polymerization step.

5. The process of claim 1, further comprising the step of controlling a composition of the coupled multimodal monovinylarene-conjugated diene block copolymer to control an average domain particle size in the high impact polystyrene.

6. The process of claim 5, wherein controlling the composition of the coupled multimodal monovinylarene-conjugated diene block copolymer comprises utilizing the coupled multimodal monovinylarene-conjugated diene block copolymer comprising a conjugated diene polymer content of greater than about 20 wt % and a monovinylarene content of greater than 50 wt. %.

7. The process of claim 1, wherein the emulsion comprises from about 60 wt. % to about 99 wt. % first monovinylarene component, about 0.5 wt. % to about 8 wt. % coupled multimodal monovinylarene-conjugated diene block copolymer, and about 1 wt. % to about 30 wt. % first conjugated diene polymer, based upon a total weight of the emulsion.

8. The process of claim 1, wherein the first monovinylarene component, the coupled multimodal monovinylarene-conjugated diene block copolymer, and the first conjugated diene polymer are combined in a first apparatus to form the emulsion, and the emulsion is then supplied to a reactor where the first monovinylarene component is polymerized in the presence of the emulsion.

9. The process of claim 1, wherein the emulsion comprises at least a first and a second emulsion separately formed, wherein the first emulsion has an average globule particle size that is different from an average globule particle size of the second emulsion, wherein the first emulsion comprises the first monovinylarene component, the first conjugated diene polymer, and the coupled multimodal monovinylarene-conjugated diene block copolymer, and the second emulsion comprises the first monovinylarene component, the first conjugated diene polymer, and a different coupled multimodal monovinylarene-conjugated diene block copolymer.

10. The process of claim 1, wherein combining the coupled multimodal monovinylarene-conjugated diene block copolymer, the first conjugated diene polymer, and the first monovinylarene component comprises combining more than one coupled multimodal monovinylarene-conjugated diene block copolymer, wherein each coupled multimodal monovinylarene-conjugated diene block copolymer is different.

11. The process of claim 1, wherein the step of polymerizing the first monovinylarene component in the presence of the emulsion comprises polymerizing the first and a second monovinylarene component in the presence of the emulsion.

12. The process of claim 11, wherein the step of polymerizing the first monovinylarene component in the presence of the emulsion with the first and second monovinylarene component comprises supplying the second monovinylarene component to more than one reactor to polymerize the first and second monovinylarene components.

13. The process of claim 11, wherein the step of polymerizing the first monovinylarene component in the presence of the emulsion with the first and second monovinylarene component comprises supplying the second monovinylarene component to any reactor to polymerize the first and second monovinylarene components.

14. The process of claim 1, comprising polymerizing a mixture of a second conjugated diene polymer and a second monovinylarene component with a third monovinylarene component beyond phase inversion of the second conjugated diene polymer and supplying a resultant composition and the emulsion to a common reactor to polymerize the first monovinylarene component.

15. The process of claim 1, wherein the high impact polystyrene comprises domains of the coupled multimodal monovinylarene-conjugated diene block copolymer and the first conjugated diene polymer that have been grafted during polymerization of the first monovinylarene component.

16. The process of claim 1, wherein a domain size distribution of the coupled multimodal monovinylarene-conjugated diene block copolymer and the first conjugated diene polymer is at least bimodal.

17. The process of claim 1, wherein a domain size distribution of the coupled multimodal monovinylarene-conjugated diene block copolymer and the first conjugated diene polymer is narrower than a 1-2-4 ratio size distribution for 10%, 50%, and 90% accumulative volume particle sizes.

18. The process of claim 17, wherein the domain size distribution has a 1-2-3 ratio size distribution for 10%, 50%, and 90% accumulative volume particle sizes.

19. The process of claim 1, wherein the coupled multimodal monovinylarene-conjugated diene block copolymer comprises at least one tapered block segment.

20. The process of claim 1, wherein the high impact polystyrene has a ⅛" notch Izod in a range of about 0.50 ft-lb/inch to about 8 ft-lb/inch.

21. A high impact polystyrene composition comprising a 60 degree angle gloss at a mold temperature of 150° F. in a range of about 85% to about 105%, a tensile yield strength in a range of about 3800 psi to about 5500 psi, and a ⅛" notch Izod in a range of about 0.50 ft-lb/inch to about 8 ft-lb/inch;
wherein the high impact polystyrene composition comprises domains of a dispersed phase comprising a coupled multimodal monovinylarene-conjugated diene block copolymer.

22. A molded article comprising the high impact polystyrene composition of claim 21.

23. The high impact polystyrene composition of claim 21 comprising a first conjugated diene polymer contained within a continuous phase of a monovinylarene polymer, wherein the domains of the dispersed phase comprising the coupled multimodal monovinylarene-conjugated diene block copolymer comprise a monovinylarene component content of greater than 50 wt. %.

24. A process of making a high impact polystyrene comprising the steps of:
a) combining a first monovinylarene component, a first conjugated diene polymer, and a coupled multimodal monovinylarene-conjugated diene block copolymer to produce a feedstock emulsion, the coupled multimodal monovinylarene-conjugated diene block copolymer comprising a monovinylarene component content of greater than 50 wt. %; and
b) polymerizing a first monovinylarene component in the presence of the feedstock emulsion.

25. The process of claim 24, wherein the feedstock emulsion comprises from about 60 wt. % to about 99 wt. % first monovinylarene component, about 0.5 wt. % to about 8 wt. % coupled multimodal monovinylarene-conjugated diene block copolymer, and about 1 wt. % to about 30 wt. % first conjugated diene polymer.

26. The process of claim 24, wherein the feedstock emulsion comprises globules having an average globule particle size in a range of about 0.01 microns to about 50 microns.

27. A process of making a feedstock emulsion comprising the step of combining a monovinylarene component, a coupled multimodal monovinylarene-conjugated diene block copolymer, and a first conjugated diene polymer to produce the feedstock emulsion, the coupled multimodal monovinylarene-conjugated diene block copolymer comprising a monovinylarene component content of greater than 50 wt. %.

28. The process of claim 27, wherein the coupled multimodal monovinylarene-conjugated diene block copolymer acts as an emulsifier with the first conjugated diene polymer to form globules within the feedstock emulsion.

29. A process of making a high impact polystyrene comprising the steps of:
(a) combining a first monovinylarene component and a first conjugated diene polymer to produce a reactor feed stream;
(b) combining the reactor feed stream with a coupled multimodal monovinylarene-conjugated diene block copolymer comprising a monovinylarene content of greater than 50 wt. % to produce a reactor feed content; and
(c) reacting the reactor feed content to polymerize the first monovinylarene component to produce the high impact polystyrene.

30. The process of claim 29, wherein the coupled multimodal monovinylarene-conjugated diene block copolymer comprises at least one tapered block segment.

31. The process of claim 29, wherein the high impact polystyrene comprises a 60 degree angle gloss at a mold temperature of 150° F. in a range of about 90% to about 100%; a tensile yield strength in a range of about 3800 psi to about 5500 psi; and a ⅛" notched Izod in a range of about 0.50 ft-lb/inch to about 8 ft-lb/inch.

32. The process of claim 29, wherein the high impact polystyrene comprises an average domain particle size of the coupled multimodal monovinylarene-conjugated diene block copolymer and the first conjugated diene polymer of about 0.01 microns to about 50 microns.

33. The process of claim 29, wherein the high impact polystyrene comprises a 1-2-3 domain size distribution for 10%, 50%, and 90% accumulative volume particle sizes.

34. A process of making a high impact polystyrene comprising polymerization of a monovinylarene component in the presence of a feedstock additive comprising a first conjugated diene polymer and a coupled multimodal monovinylarene-conjugated diene block copolymer, the coupled multimodal monovinylarene conjugated diene block copolymer comprising a monovinylarene content of greater than 50 wt. %.

35. The process of claim 34, comprising up to about 80 wt. % of the first conjugated diene polymer based on a total polymer solids in a feed stock.

36. The process of claim 34, wherein at least about 90 wt. % of the first conjugated diene polymer comprises a cis configuration based on a total polymer solids in a feed stock.

37. The process of claim 34, wherein the coupled multimodal monovinylarene-conjugated diene block copolymer comprises at least one tapered block segment.

38. The process of claim 34, comprising at least about 20 wt. % of the coupled multimodal monovinylarene-conjugated diene block copolymer based on a total polymer solids in a feed stock.

39. The process of claim 1, wherein the first conjugated diene comprises a conjugated diene in at least about 90% cis configuration.

40. The process of claim 29, comprising controlling a viscosity of the reactor feed content to control an average domain particle size of the high impact polystyrene.

* * * * *